(12) United States Patent
Hashimoto et al.

(10) Patent No.: US 7,133,747 B2
(45) Date of Patent: Nov. 7, 2006

(54) ROBOT CONTROLLER

(75) Inventors: Yoshiki Hashimoto, Hadano (JP); Yoshiyuki Kubo, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 177 days.

(21) Appl. No.: 10/679,295

(22) Filed: Oct. 7, 2003

(65) Prior Publication Data

US 2004/0078116 A1 Apr. 22, 2004

(30) Foreign Application Priority Data

Oct. 8, 2002 (JP) .............................. 2002/295414
Sep. 19, 2003 (JP) .............................. 2003/328293

(51) Int. Cl.
  G05B 15/00 (2006.01)
  G05B 19/00 (2006.01)
(52) U.S. Cl. ..................... 700/264; 700/245; 714/24
(58) Field of Classification Search ................ 700/245, 700/256, 264; 361/680, 683, 71–75; 701/23; 903/3; 714/15, 24

See application file for complete search history.

(56) References Cited

U.S. PATENT DOCUMENTS

| 4,514,816 A * | 4/1985 | Ollus et al. ................. 700/223 |
| 5,297,149 A * | 3/1994 | Kazato .......................... 714/24 |
| 5,847,359 A * | 12/1998 | Sugahara et al. ...... 219/121.72 |
| 6,356,806 B1 * | 3/2002 | Grob et al. ................. 700/245 |
| 2003/0083784 A1 * | 5/2003 | Nagai et al. ................ 700/245 |

FOREIGN PATENT DOCUMENTS

| JP | 4-98594 | 8/1992 |
| JP | 07-195285 | 8/1995 |
| JP | 07-271404 | 10/1995 |
| JP | 08-206988 | 8/1996 |
| JP | 9-117888 | 5/1997 |
| JP | 11-073201 | 3/1999 |
| JP | 11-154006 | 6/1999 |
| JP | 2001-157986 | 6/2001 |
| JP | 2002-127075 | 5/2002 |

OTHER PUBLICATIONS

Notice of Grounds for Rejections dated Mar. 30, 2005.
Notice of Grounds for Rejection (Office Action) for corresponding Japanese Application No. 2003-328293 dated Jun. 30, 2005.

* cited by examiner

Primary Examiner—Thomas Black
Assistant Examiner—McDieunel Marc
(74) Attorney, Agent, or Firm—Staas & Halsey LLP

(57) ABSTRACT

When the emergency stop button on the teaching pendant is pressed, the packet generating circuits 1 and 2 each prepare packet data relating to emergency stopping, and transmit this data to the robot control part by wireless communications via the transmission data switching circuit. Besides data indicating the need or lack of need for emergency stopping, a header or the like designating the packet receiving circuit to which the transmission is addressed is added to the packet data. The respective packet receiving circuits of the robot control part receive the respective sets of packet data in accordance with the designations of the headers. When the emergency stop button is pressed, emergency stop signals are output to a plurality of emergency stop control circuits from the respective packet receiving circuits immediately afterward, and a plurality of contacts connected in series are placed in a non-conductive state, so that the supply of motive force to the servo amplifiers is cut off, thus causing the robot to make an emergency stop.

14 Claims, 12 Drawing Sheets ated operating means that release this emergency-stop state is connected by wireless communications with an control part that controls the robot.

ROBOT CONTROLLER

BACKGROUND OF THE INVENTION

1. Field of the Invention

The present invention relates to a robot controller, and more particularly relates to a robot controller in which a portable instruction and operating part comprising emergency stop operating means that place the robot in an emergency-stop state and emergency stop release operating means that release this emergency-stop state is connected by wireless communications with an control part that controls the robot.

2. Description of the Related Art

The connection of a portable teaching operating part equipped with an emergency-stop button or the like as emergency stop operating means used to cause emergency stopping of a robot, and a control part used to control the robot, by means of wireless communications, so that the operator can cause emergency stopping of the robot by operating the emergency-stop button or the like installed in the portable teaching operating part, is a conventionally known technique, and is disclosed for example in Japanese Patent Application Laid-Open No. H11-73201 and Japanese Patent Application Laid-Open No. H9-117888.

First, in Japanese Patent Application Laid-Open No. H11-73201, a communications system is disclosed in which the exchange of data between a robot control part (first device) and a robot teaching box (second device) is accomplished by wireless communications or optical communications. In this communications system, the robot control part (first device) and the teaching box (second device) are respectively provided with a transmitting part and a receiving part. Furthermore, the system is constructed so that the receiving part and transmitting part of the teaching box (second device) respectively handle the reception of data from the robot control part (first device) and the transmission of specified data as a response to this received data under normal conditions, but so that this response is stopped under abnormal conditions.

In this technique, the robot control part can ascertain the occurrence of an abnormality by the fact that there is no response from the teaching box, and can cause emergency stopping of the robot. Furthermore, in cases where trouble occurs in the teaching box as well, a tentative failsafe function is ensured by the lack of a response.

Specifically, compared to a system in which a signal indicating an abnormality is transmitted to the robot control part from the teaching box in the case of an abnormality, the possibility of avoiding a state in which "the transmission of an indication of an abnormal state to the robot control part becomes impossible because of trouble in the teaching box" is increased, so that the function of preserving the safety of the operator is correspondingly heightened.

Next, in Japanese Patent Application Laid-Open No. H9-117888, a remote operating system is disclosed in which communications are performed with the control part of a robot (movable part used for operation and object of control having driving means that drive this movable part) using a remote control transmitter which has a driving control switch and a control enabling switch operated by manual operation.

In this remote operating system, in a state in which the abovementioned control enabling switch has been operated, a base signal is continuously transmitted to the control part of the robot. On the other hand, when the abovementioned driving control switch is operated, a corresponding driving control signal is transmitted to the control part of the robot. Furthermore, it is indicated that in the robot control part, the robot is controlled in accordance with the abovementioned driving control signal that is received only while the abovementioned base signal is being received at specified time intervals; when the abovementioned base signal is cut of, the robot is stopped regardless of whether a driving control signal is received or not. In this system as well, a failsafe function against trouble in the remote control transmitter is tentatively ensured by making the periodic reception of the base signal a condition for the driving of the robot.

However, in both of these conventional techniques, as was described above, only a single circuit for stopping the robot is provided. Accordingly, although consideration is given to safety in cases where wireless communications are cut off, no countermeasures are provided for cases in which it becomes impossible to stop the robot because of trouble in the circuit that stops the robot.

SUMMARY OF THE INVENTION

The basic approach of the present invention is to create redundancy by using a plurality of transmitting means and receiving means for the transmission and reception of emergency stop signals in order to make it possible to connect a portable teaching operating part such as a teaching pendant and a robot control part by wireless communications while ensuring safety. By using this approach, it is possible to ensure safety by causing emergency stopping of the robot as long as there is at least a single system, which transmits an emergency stop signal in order to stop the robot, functioning normally, even if trouble should occur in more than one of a plurality of systems used for this purpose.

In concrete terms, the present invention is applied to a robot controller which is constructed so that wireless communications are performed between a portable teaching operating part comprising [i] emergency stop operating means which place the robot in an emergency-stop state when the supply of power to the driving motor of the robot is cut off, and [ii] emergency stop release operating means which release the abovementioned emergency-stop state and restore the abovementioned robot to a movable state, and a control part for controlling the abovementioned robot.

Furthermore, according to the characterizing feature of the present invention, a plurality of generating circuits which respectively generate communications data expressing an emergency stop command based on operations for the abovementioned emergency stop operating means, and which respectively generate communications data expressing an emergency stop release command based on operations for the abovementioned emergency stop release operating means, and transmitting means which transmit the communications data expressing the abovementioned emergency stop command and the communications data expressing the abovementioned emergency stop release command to the abovementioned control part by wireless communications, are disposed in the abovementioned portable teaching operating part.

Furthermore, receiving means which receive communications data expressing the abovementioned emergency stop command and communications data expressing the abovementioned emergency stop release command are disposed in the abovementioned control part, and the abovementioned robot is placed in an emergency-stop state in cases where communications data expressing an emergency stop command generated by the abovementioned plurality of generating circuits is received by even one of the abovementioned receiving means.

Here, an emergency stop signal is generated in cases where an operation for the purpose of emergency stopping is performed for the abovementioned emergency stop operating means, and at least one of the abovementioned plurality of generating circuits receives the abovementioned emergency stop signal via a CPU and generates communications data expressing an emergency stop command.

Alternatively, an emergency stop signal may be generated in cases where an operation for the purpose of emergency stopping is performed for the abovementioned emergency stop operating means, at least two of the abovementioned plurality of generating circuits receive the abovementioned emergency stop signal via CPUs and respectively generate communications data expressing an emergency stop command, means are provided which cause each of the abovementioned two CPUs to monitor the operation of the other CPU, and in cases where one of the CPUs detects an abnormal operation of the other CPU, the abovementioned control part is notified of the detection of this abnormality, and the robot is placed in a stopped state.

The improvement effected according to the present invention may also be an improvement in which the following conditions are fulfilled for a robot controller which is constructed so that a portable teaching operating device comprising emergency stop operating means which place the abovementioned robot in an emergency-stop state by cutting off the supply of electric power to the driving motor of the robot and emergency stop release operating means which release the abovementioned emergency-stop state and restore the abovementioned robot to a movable state performs wireless communications with a control part which controls the abovementioned robot.

Specifically, a plurality of generating circuits which generate communications data expressing an emergency stop command based on operations for the abovementioned emergency stop operating means and which generated communications data expressing an emergency stop release command based on operations for the abovementioned emergency stop release operating means, and a plurality of transmitting means which transmit the communications data expressing the abovementioned emergency stop command and the communications data expressing the abovementioned emergency stop release command to the abovementioned control part by wireless communications (corresponding to each of the abovementioned plurality of generating circuits), are disposed in the abovementioned portable teaching operating part.

Furthermore, a plurality of receiving means for receiving the communications data from the abovementioned transmitting means (corresponding to each of the abovementioned plurality of transmitting means) are disposed in the abovementioned control part, and in cases where communications data expressing an emergency stop command is received by at least one of the receiving means, the robot is placed in an emergency-stop state.

Here, an emergency stop signal may be generated in cases where an operation for the purpose of emergency stopping is performed for the abovementioned emergency stop operating means, and at least one of the abovementioned plurality of generating circuits receives the abovementioned emergency stop signal via a CPU, and generates communications data expressing an emergency stop command.

Alternatively, an emergency stop signal may be generated in cases where an operation for the purpose of emergency stopping is performed for the abovementioned emergency stop operating means, at least two of the abovementioned plurality of generating circuits receive the abovementioned emergency stop signal via CPUs and respectively generate communications data expressing an emergency stop command, means are provided which cause each of the abovementioned two CPUs to monitor the operation of the other CPU, and in cases where one of the CPUs detects an abnormal operation of the other CPU, the abovementioned control part is notified of the detection of this abnormality, and the robot is placed in a stopped state.

Furthermore, the abovementioned generating circuits may generate communications data expressing a normal state in cases where an operation that places the robot in an emergency-stop state is not performed for the emergency stop operating means disposed in the abovementioned portable teaching operating part, this communications data expressing a normal state is transmitted to the abovementioned control part from the abovementioned transmitting means by wireless communications at a transmission frequency that is not less than a specified transmission frequency, and in cases where the receiving means disposed in the abovementioned control part cannot receive the abovementioned communications data expressing a normal state within a specified time period, the abovementioned robot is stopped by an emergency stop control circuit.

Furthermore, the communications data expressing an emergency stop command received by the receiving means disposed in the abovementioned control part may be sent to a plurality of emergency stop control CPUs installed corresponding to each of the abovementioned plurality of generating circuits, and so that the CPUs that receive communications data expressing an emergency stop command place the abovementioned robot in an emergency-stop state.

Furthermore, each of the plurality of emergency stop control CPUs disposed in the abovementioned control part may monitor the operating state of the other emergency stop control CPUs, and the robot is stopped when abnormal operation of any of the CPUs is detected.

Moreover, a CPU other than the abovementioned emergency stop control CPUs may monitor the operating state of the emergency stop control CPUs, and the robot is stopped when abnormal operation of at least one of the emergency stop control CPUs is detected.

Furthermore, in the respective cases described above, the timing of the transmission from the abovementioned portable teaching operating part to the abovementioned control part is varied depending on urgency of the communications content.

The present invention makes it possible to improve a robot controller in which a portable teaching operating part comprising emergency stop operating means for placing the robot in an emergency-stop state and emergency stop release operating means for releasing this emergency-stop state is connected by wireless communications with a control part that controls the robot, so that the danger that stopping of the robot will become impossible due to trouble in the circuit that stops the robot can be avoided with a high degree of reliability.

DESCRIPTION OF THE PREFERRED EMBODIMENTS

Several embodiments (Embodiment 1 through Embodiment 7) of the present invention will be described below.

Embodiment 1

Figure 1:
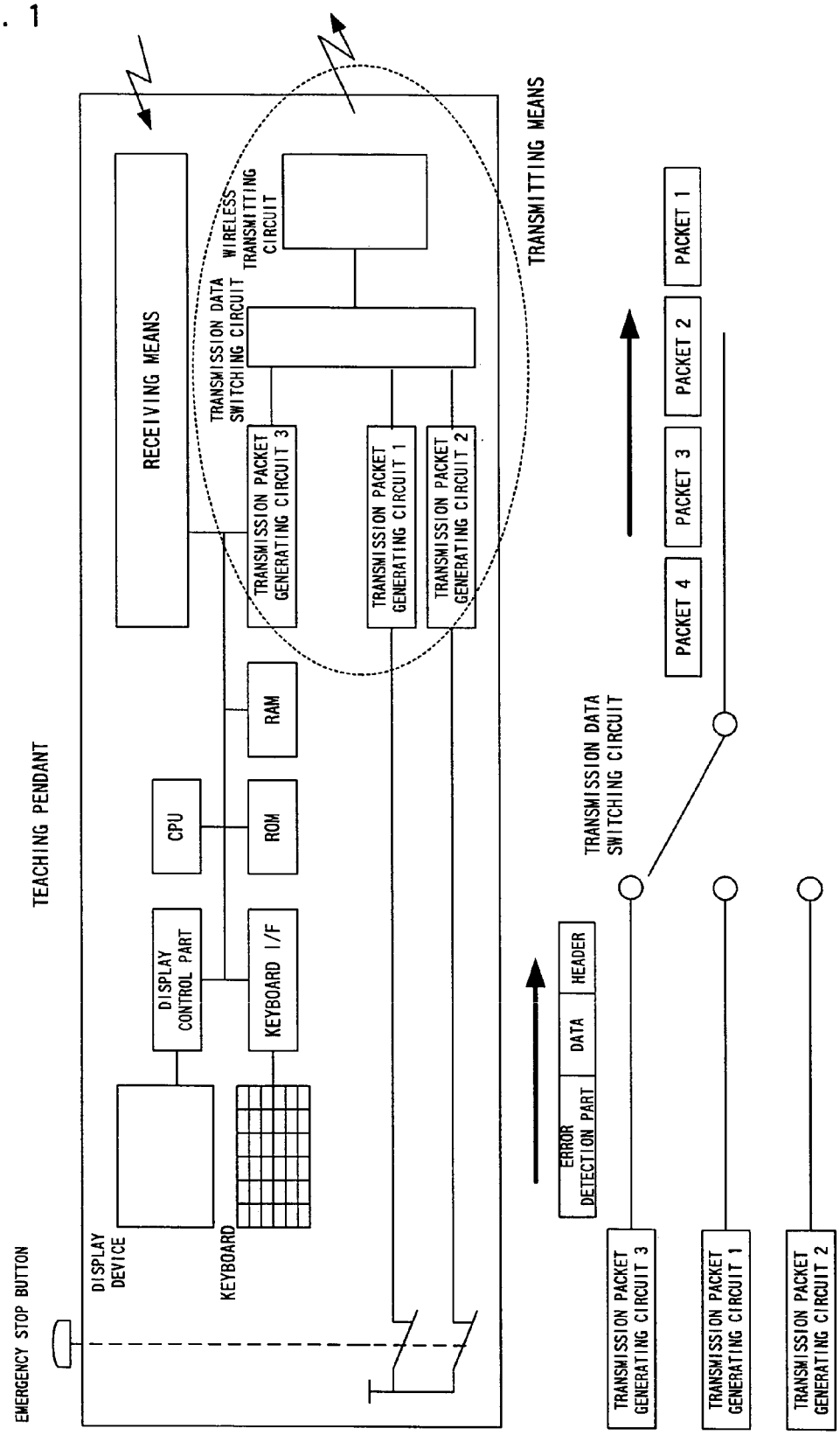
FIG. 1 is a diagram which illustrates the teaching pendant that is used in Embodiment 1 of the present invention, and that can also be used in Embodiments 5 through 7.
Figure 2:
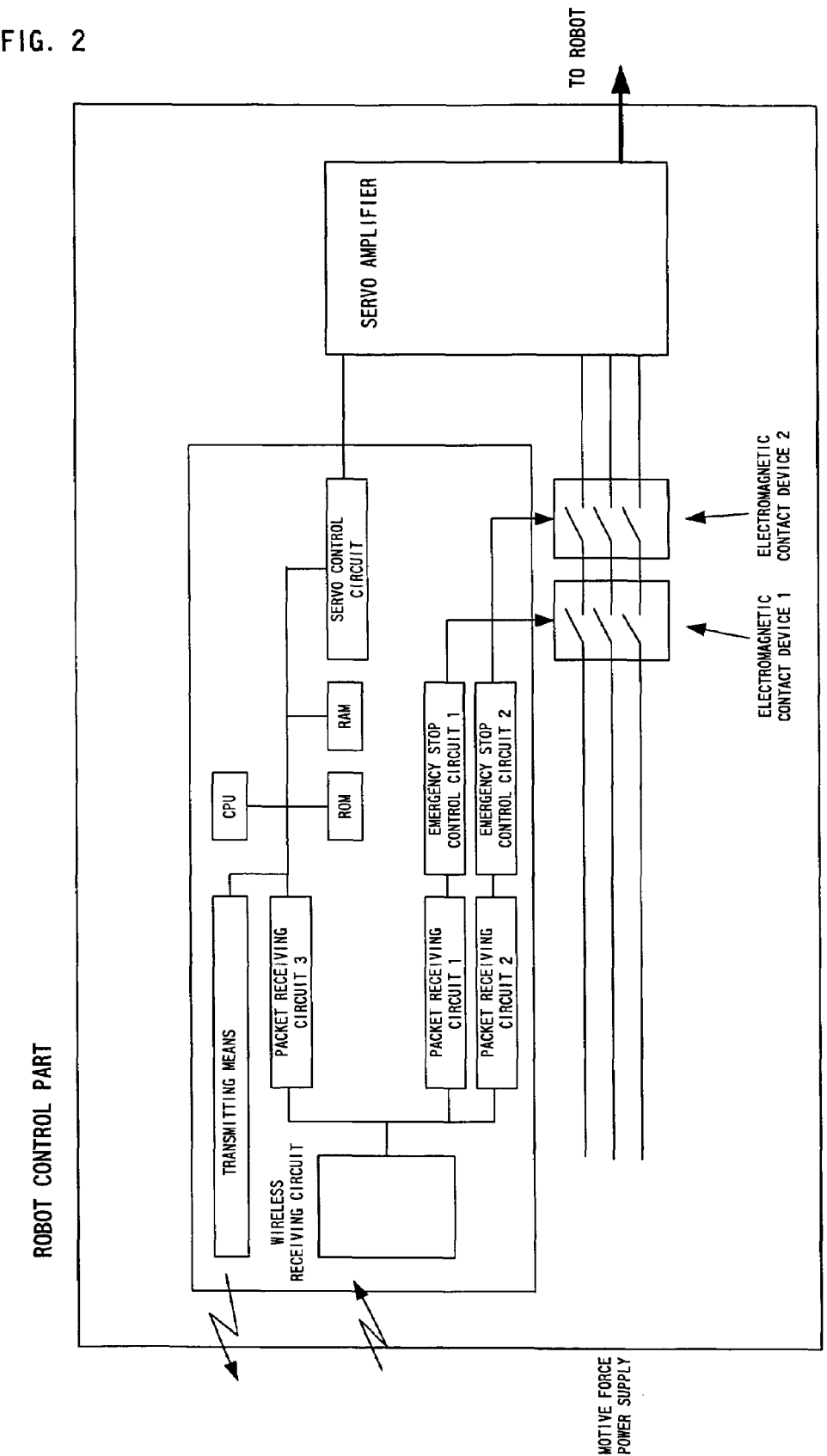
FIG. 2 is a diagram which illustrates the robot control part used in Embodiment 1 of the present invention.

FIG. 1 is a diagram which illustrates the teaching pendant used in Embodiment 1. This figure shows a schematic diagram of the panel with an emphasis on parts relating to the generation, transmission, reception and the like of emergency stop signals. Furthermore, FIG. 2 is a diagram which illustrates the robot control part used in Embodiment 1. This figure shows a schematic diagram of the robot control part with an emphasis on communications relating to the emergency stopping of the robot and parts relating to the control of the robot.

First, with reference to FIG. 1, the teaching pendant that constitutes a portable teaching operating part has a CPU, and a ROM, RAM, display control part and keyboard interface that are connected to this CPU; a display device (e.g., a liquid crystal display) is connected to the display control part, and a keyboard (disposed on the teaching pendant) is connected to the keyboard interface.

Furthermore, receiving means and transmitting means are provided for wireless communications with the robot control part (see FIG. 2). As will be described later, the receiving means receive signals that are transmitted by wireless communications from the transmitting means, which are installed in the robot control part. The transmitting means comprise three transmission packet generating circuits, i.e., transmission packet generating circuit 1 through transmission packet generating circuit 3, a transmission data switching circuit, and a wireless transmitting circuit which is connected to the respective transmission packet generating circuits via this transmission data switching circuit.

Here, the transmission packet generating circuits 1 and 2 are circuits which transmit emergency stop signal data to the robot control part, and the transmission packet generating circuit 3 is a circuit which informs the robot control part of data such as (for example) robot position data, jog feeding command data and the like (hereafter referred to as "general data"). An emergency stop button which acts as both "emergency stop operating means" and "emergency stop release operating means" is disposed on the teaching pendant, and emergency stop signals are respectively sent to the transmission packet generating circuits 1 and 2 when the operator operates (in this case, "presses") this emergency stop button.

The transmission packet generating circuits 1 and 2 constantly prepare transmission data relating to emergency stopping at time intervals that are equal to or less than a specified period of time (e.g., 0.1 second), and send this transmission data to the transmission data switching circuit. The timing of the preparation and transmission of the transmission data may be generated inside the portable teaching operating part (using the clock of the CPU), or may be provided via communications from the robot control part.

Besides a data part expressing data that indicates a distinction as to whether the emergency stop button has been pressed or has not been pressed, the transmission data prepared by the transmission packet generating circuit 1 includes a header which indicates that the data is data that is addressed to the packet receiving circuit 1 (described later; see FIG. 2) of the robot control part, and a CRC part for detecting cases in which the data has been disturbed by noise or the like.

Similarly, in addition to a data part expressing data that indicates a distinction as to whether the emergency stop button has been pressed or has not be pressed, the transmission data prepared by the transmission packet generating circuit 2 includes a header which indicates that the data is data that is addressed to the packet receiving circuit 2 (described later; see FIG. 2) of the robot control part, and a CRC part for detecting cases in which the data has been disturbed by noise or the like.

Furthermore, in the transmission packet generating circuit 3, transmission data which includes a data part that has general data such as robot position data, jog feeding command data and the like, a header which indicates that the data is data that is addressed to the packet receiving circuit 3 (described later; see FIG. 2) of the robot control part, and a CRC part for detecting cases in which the data has been disturbed by noise or the like, is prepared in accordance with the operation of the keyboard or the like.

The transmission data switching circuit appropriately switches the transmission data that is to be transferred to the wireless transmitting circuit in accordance with requests from the transmission packet generating circuits 1, 2 and 3, and successively transfers this transmission data to the wireless transmitting circuit. The wireless transmitting circuit converts this data into a high-frequency signal, and transmits this signal by wireless transmission. As a result, the control part is notified at short time intervals as to whether or not there is a need for emergency stopping (i.e., whether the emergency stop button has been pressed or has not been pressed).

Referring to FIG. 2, the robot control part has a CPU, and a ROM, RAM and servo control circuits that are connected to this CPU. Servo control circuits are provided for each axis of the robot, and these circuits supply a motive force to servo motors for respective axes of the robot via respective servo amplifiers.

Furthermore, receiving means and transmitting means are provided for wireless communications with the teaching pendant (see FIG. 1). The receiving means include a wireless receiving circuit and packet receiving circuits 1 through 3 which are connected to this wireless receiving circuit. The packet receiving circuits 1 through 3 are packet receiving circuits which are respectively installed in correspondence with the abovementioned packet transmitting circuits 1 through 3; the packet receiving circuits 1 and 2 are respectively connected to emergency stop control circuits 1 and 2, and the packet receiving circuit 3 is connected to the transmitting means and the CPU.

The emergency stop control circuits 1 and 2 are respectively connected to an electromagnetic contact device 1 and electromagnetic contact device 2. These electromagnetic contact devices 1 and 2 are built into the motive force supply path to the servo amplifiers in a series relationship. Accordingly, if at least one of the electromagnetic contact devices 1 and 2 is placed in a "cut-off" state, the supply of a motive force to the servo amplifiers is cut off, so that the robot is immediately stopped under emergency conditions.

As was described above, transmission data (packet data) provided with a header, which indicates the origin of the packet, is transmitted by wireless communications from the teaching pendant. The wireless receiving circuit receives this data, and attempts to transfer the data to the packet receiving circuits 1 through 3. However, only the packet receiving circuits 1 and 2 or the packet receiving circuit 3 designated by the header of the packet accept the packet data; the remaining packet receiving circuits reject the acceptance of the packet data.

In a case where the packet receiving circuit 3 accepts the packet data, this data is general data such as (for example) robot position data, jog feeding command data and the like, according to the above description, and the CPU controls the robot in accordance with this data. Since matters relating to this general control of the robot have no special relationship to the present invention, a detailed description is omitted.

Meanwhile, the packet receiving circuits 1 and 2 successively receive packet data including data relating to the need for emergency stopping that is transmitted with a short period as described above. In a state in which the emergency stop button has not been pressed (generally a state in which an operation for the purpose of emergency stopping has not been performed), the packet data that is received by the packet receiving circuits 1 and 2 is data indicating that "emergency stop is not to be performed (or emergency stop release command)". As long as the system is in this state, no emergency stop signal indicating that "emergency stop is to be performed (or emergency stop command)" is output to the emergency stop control circuit 1 or 2 from either of the packet receiving circuits 1 and 2.

However, when the emergency stop button is pressed (generally, when an operation for the purpose of emergency stopping is performed), the packet data received each time by the packet receiving circuits 1 and 2 immediately changes to "emergency stop is to be performed (or emergency stop command)" from "emergency stop is not to be performed (or emergency stop release command)". As a result, an emergency stop signal is output to the emergency stop control circuits 1 and 2 from both of the packet receiving circuits 1 and 2. Consequently, the supply of a motive force to the servo amplifiers is cut off, so that the robot is immediately caused to make an emergency stop.

Furthermore, in cases where it is desired to release the emergency-stop state after the robot has been caused to make an emergency stop, it is necessary merely to return the emergency stop button to its original state. However, in order to avoid erroneous release of the emergency-stop state a further separate operation (e.g., inputting special command data from the keyboard) may be required.

The above description of operation is a description of a case in which all of the circuits are operating normally. However, the present embodiment also provides a failsafe function even if trouble should occur in the two series of circuits relating to emergency stopping.

As an example, a case will be considered in which the transmission packet generating circuit 1 malfunctions, so that a packet indicating that the emergency stop button has been pressed is not transmitted even if the emergency stop button is actually pressed. Even in such a case, the other transmission packet generating circuit 2 notifies the control part side of an emergency-stop state (as long as this transmission packet generating circuit is not simultaneously malfunctioning), so that the robot can be safely caused to make an emergency stop.

For similar reasons, even if one of the transmission packet generating circuits 1 or 2, one of the packet receiving circuits 1 or 2, one of the emergency stop control circuits 1 or 2 or one of the electromagnetic contact devices 1 or 2 malfunctions so as not to operate normally, safety can be ensured by the other normal circuit.

Furthermore, in cases where such trouble occurs, since the states of the two emergency stop control circuits are different from each other where these states should be the same under normal conditions, the fact that trouble has occurred can easily be detected. Accordingly, for example, the outputs of the emergency stop control circuits 1 and 2 may also be sent to the CPU, the CPU ascertains at short intervals whether the emergency stop control circuits 1 and 2 are in the same state or different states, and if the emergency stop control circuits are in different states, an alarm indicating "trouble in connection with the emergency stop function" is issued.

Furthermore, instead of this or in addition to this, the CPU would be able to monitor whether the electromagnetic contact devices 1 and 2 are in the same state or different states with regard to the opening and closing of the contacts, and so that an alarm indicating "trouble in connection with the emergency stop function" is issued if the electromagnetic contact devices 1 and 2 are in different states. The need for repair can be ascertained by means of such an alarm, so that a situation in which both systems are malfunctioning can be almost completely avoided.

Furthermore, in the present embodiment, it is not particularly difficult to design the system so that an emergency-stop state is not replaced with a packet indicating a state that expresses an emergency stop release as a result of trouble in the transmission data switching circuit, wireless transmitting circuit or wireless receiving circuit in cases where such trouble occurs. Specifically, by generating a CRC code that indicates the appropriateness of the contents of the packets inside the transmission packet generating circuits, it is possible to detect the non-matching of CRC codes on the receiving side in cases where the contents of the packets are rewritten at an intermediate point, so that the packet information can be rejected.

Furthermore, wireless communications may be impeded by noise and the like. While communications are thus impeded, there is a danger if an emergency stop is not be transmitted. Accordingly, a watchdog timer may be installed in the receiving means, and in cases where a packet transmitting an emergency-stop state is not received within a fixed period of time, an emergency stop signal is output to the emergency stop control circuits 1 and 2 in the same manner as in cases where data expressing an emergency stop is transmitted, so that the robot is caused to make an emergency stop.

Next, one modification of Embodiment 1 described above will be described with reference to FIGS. 3 and 4.

In Embodiment 1 described with reference to FIGS. 1 and 2, emergency stop signal data is transmitted as individual packet information respectively generated by the transmission packet generating circuit 1 and transmission packet generating circuit 2. Instead of this, it would also be possible to transmit respective sets of emergency stop signal data with this data included in a single set of transmission data. In this case, the construction on the teaching operating side is as shown in FIG. 3, and the construction of the robot control part is as shown in FIG. 4.

Figure 3:
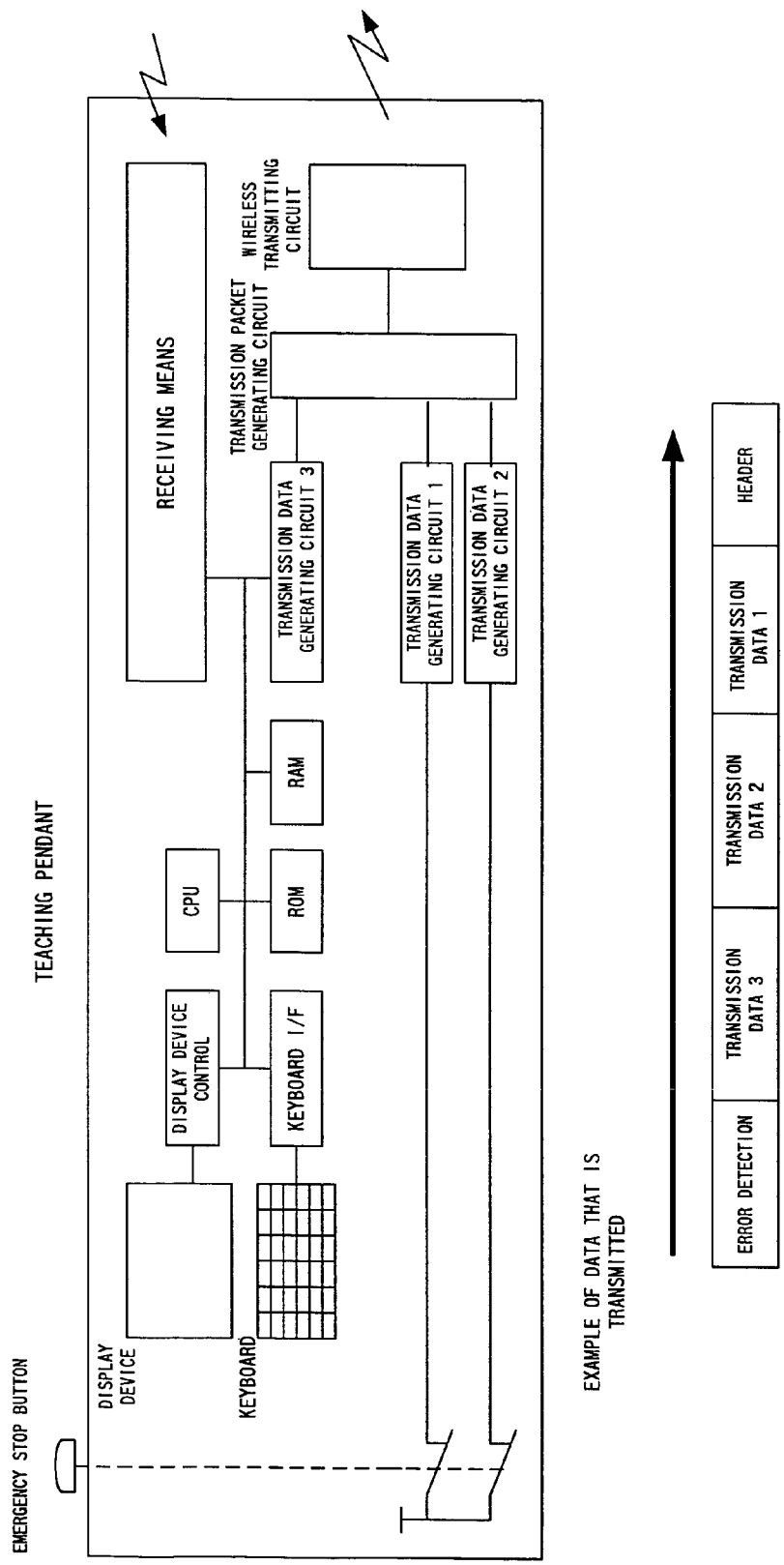
FIG. 3 is a diagram which illustrates one modification of the teaching pendant used in Embodiment 1 of the present invention.

As is shown in FIG. 3, emergency stop signals are respectively transmitted to the transmission data generating circuit 1 and transmission data generating circuit 2. Furthermore, general data is transmitted to the transmission data generating circuit 3. The transmission packet generating circuit joins the data of the transmission data generating circuits 1, 2 and 3, adds header information and test information such as a CRC and the like, and sends this data out to the wireless transmitting circuit.

Figure 4:
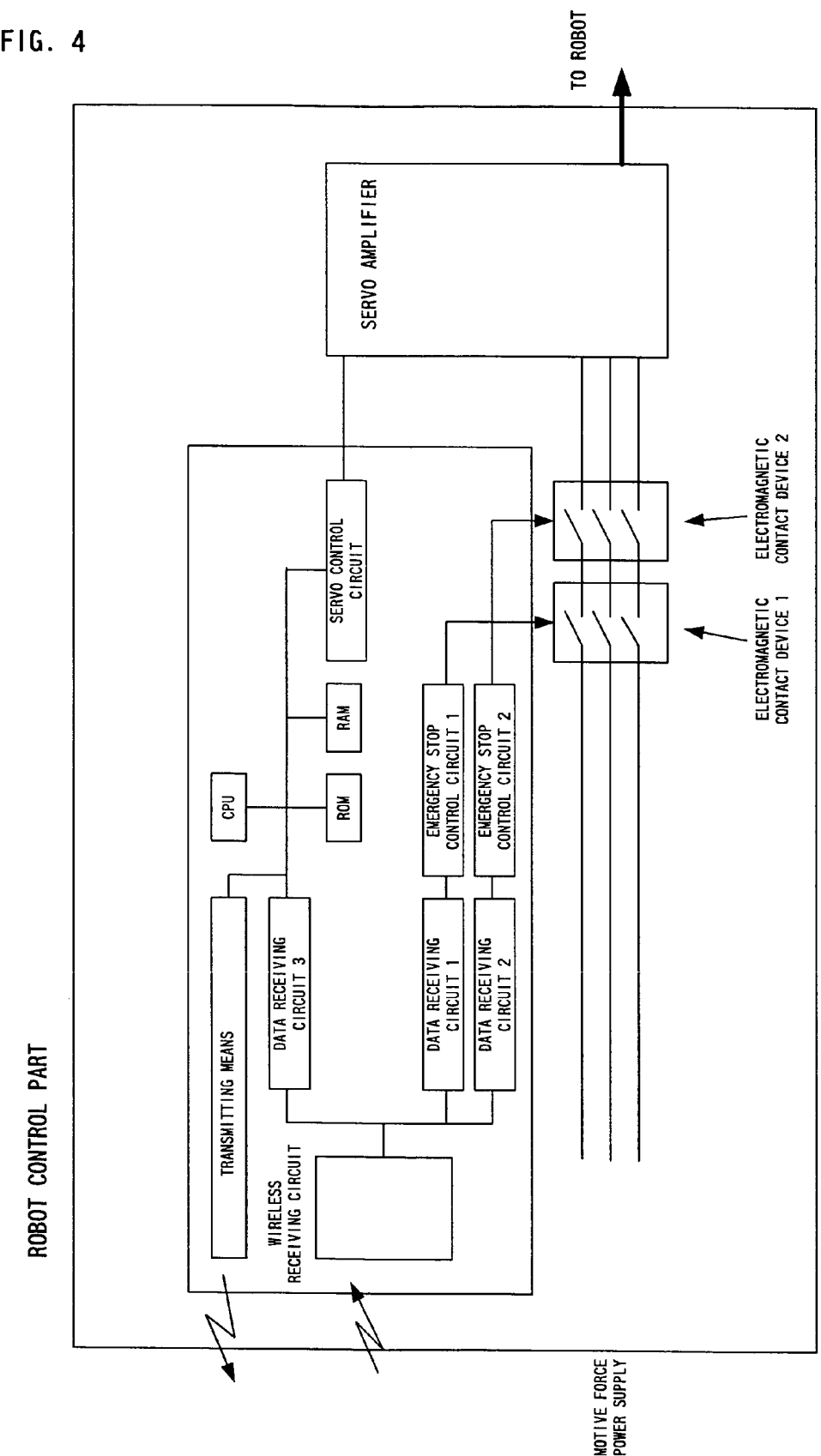
FIG. 4 is a diagram which illustrates one modification of the robot control part used in Embodiment 1 of the present invention.

Meanwhile, in the robot control part shown in FIG. 4, the wireless signal sent out from the wireless transmitting circuit is received by a wireless receiving circuit. In this case, the data generated by the transmission data generating circuits 1, 2 and 3 is respectively sent to the data receiving circuits 1, 2 and 3.

Thus, in the modification shown in FIGS. 3 and 4 as well, safety can be ensured in the same manner as in Embodiment 1 shown in FIGS. 1 and 2.

Embodiment 2

Figure 5:
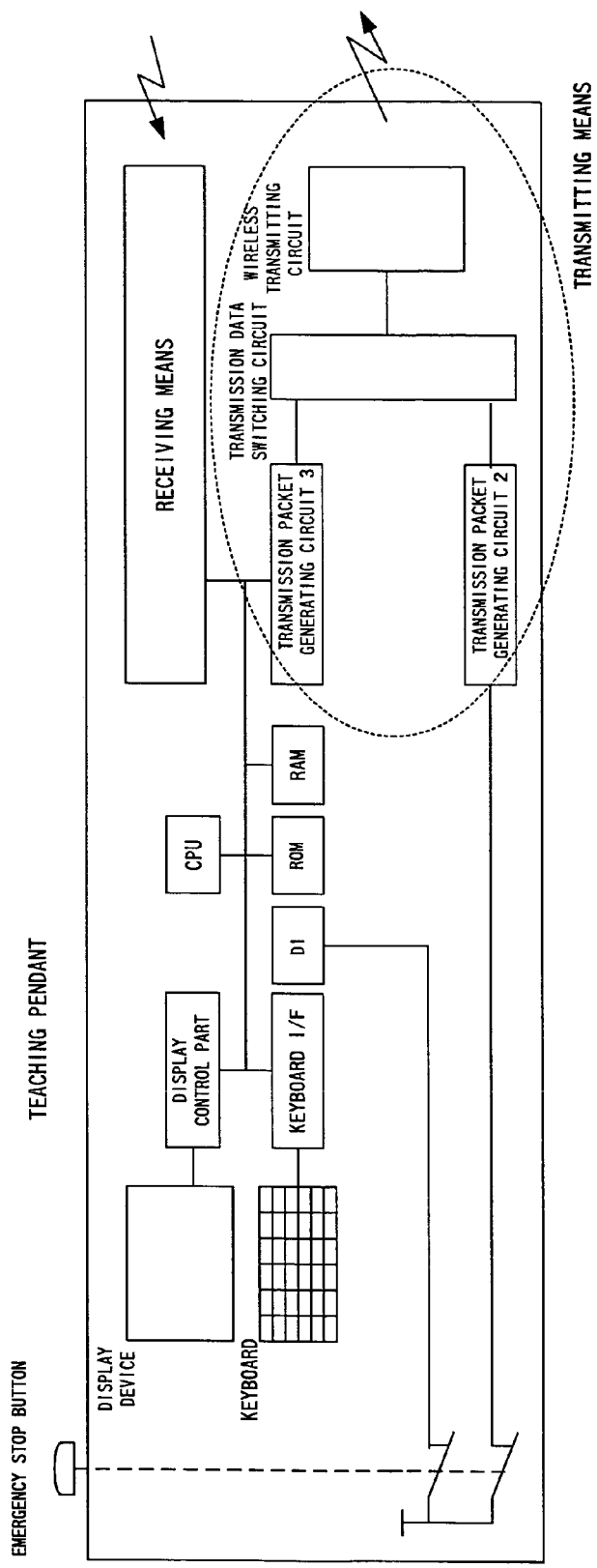
FIG. 5 is a diagram which illustrates the teaching pendant used in Embodiment 2 of the present invention.
Figure 6:
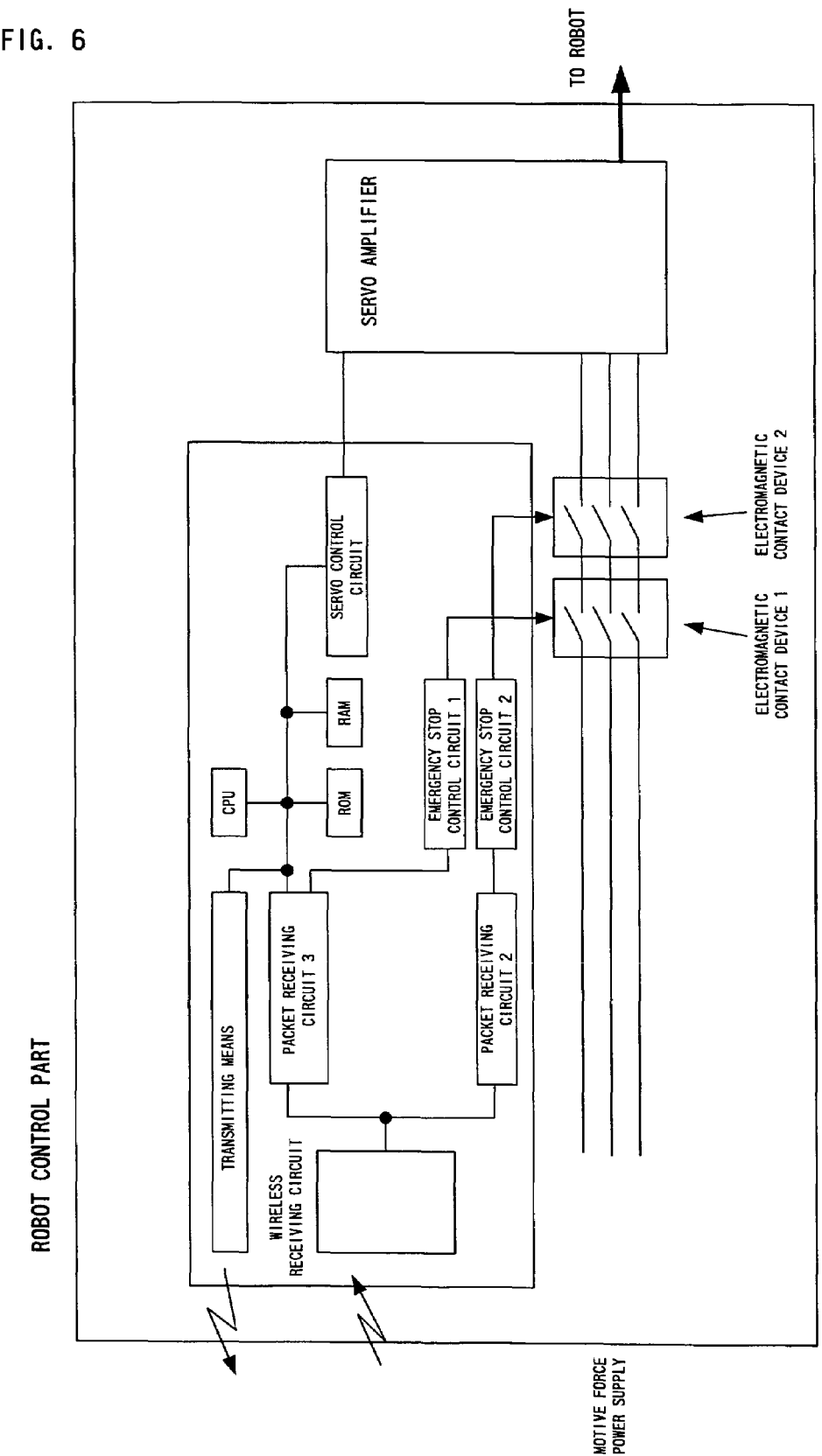
FIG. 6 is a diagram which illustrates the robot control part used in Embodiment 2 of the present invention.

FIG. 5 is a diagram which illustrates the teaching pendant used in Embodiment 2. This figure shows a schematic diagram of the panel with an emphasis on parts relating to the generation, transmission, reception and the like of emergency stop signals. Furthermore, FIG. 6 is a diagram which illustrates the robot control part used in Embodiment 2. This figure shows a schematic diagram with an emphasis on communications relating to the emergency stopping of the robot, and parts relating to the control of the robot.

The present embodiment uses a system which is devised so that one of the two emergency stop signals in Embodiment 2 is read from the CPU, and the CPU transmits communications data originating in this emergency stop signal to the control part side via transmitting means. In the present embodiment, a case is indicated in which the CPU that reads the emergency stop signal also has the function of controlling the display device and keyboard of the teaching operating part.

First, referring to FIG. 5, the teaching pendant that constitutes the portable teaching operating part has a CPU, and a ROM, RAM, display control part, keyboard interface and DI (data interface) that are connected to this CPU. A display device (e.g., a liquid crystal display) is connected to the display control part, and a keyboard (disposed on the teaching pendant) is connected to the keyboard interface.

Furthermore, receiving means and transmitting means are provided for wireless communications with the robot control part (see FIG. 6). The receiving means receive signals that are sent by wireless communications from transmitting means disposed in the robot control part. The transmitting means comprise two transmission packet generating circuits 3, a transmission data switching circuit, and a wireless communications circuit which is connected to the respective transmission packet generating circuits via the abovementioned transmission data switching circuit.

Here, the transmission packet generating circuit 2, like the transmission packet generating circuit 1 or 2 in Embodiment 1, is a circuit for sending emergency stop signal data to the robot control part. On the other hand, the transmission packet generating circuit 3 is a circuit for notifying the robot control part of general data (robot position data, jog feeding command data and the like) in addition to emergency stop signal data.

An emergency stop button which serves as both "emergency stop operating means" and "emergency stop release operating means" is disposed in an appropriate place on the teaching pendant, and when the operator operates (here, "presses") this emergency stop button, an emergency stop signal is sent to the transmission packet generating circuit 2, and an emergency stop signal is also read by the CPU via the DI (data interface). Accordingly, the CPU checks for the presence or absence of an emergency stop signal output (or pressing or non-pressing of the emergency stop button) at sufficiently short intervals.

The transmission packet generating circuit 3 constantly prepares transmission data relating to emergency stopping under the control of the CPU at time intervals that are equal to or shorter than a specified period of time (e.g., 0.1 second), and sends this data to the transmission data switching circuit. Furthermore, as in the case of the abovementioned embodiment, the transmission packet generating circuit 2 also prepares transmission data relating to emergency stopping at short time intervals, and sends this data to the transmission data switching circuit. The timing of the preparation and transmission of the transmission data is determined utilizing the clock of the CPU.

Besides a data part expressing data which indicates the distinction between pressing and non-pressing of the emergency stop button, the transmission data prepared by the transmission packet generating circuit 2 includes a header which indicates that the data is data that is addressed to the packet receiving circuit 2 (described later; see FIG. 6) of the robot control part, and a CRC part for detecting cases where the data is disturbed by noise or the like.

Meanwhile, the transmission data prepared by the transmission packet generating circuit 3 includes data relating to emergency stopping (which is prepared at short time intervals) and general data (prepared when the keyboard is operated or the like). Besides a data part expressing data which indicates the distinction between pressing and non-pressing of the emergency stop button, the data relating to emergency stopping includes a header which indicates that the data is data that is addressed to the packet receiving circuit 3 (described later; see FIG. 6) of the robot control part, and a CRC part for detecting cases where the data is disturbed by noise or the like.

The transmission data switching circuit appropriately switches the transmission data that is to be transferred to the wireless transmitting circuit in accordance with requests from the transmission packet generating circuits 2 and 3, and successively transfers this transmission data to the wireless transmitting circuit. The wireless transmitting circuit converts this data into a high-frequency signal, and transmits this signal by wireless transmission. As a result, the robot control part is notified at short time intervals as to whether or not there is a need for emergency stopping (i.e., whether the emergency stop button has been pressed or has not been pressed). Furthermore, the robot control part is notified of general data when necessary, e.g., at the time of keyboard operation or the like.

Referring to FIG. 6, the robot control part has a CPU, and a ROM, RAM and servo control circuits that are connected to this CPU. Servo control circuits are provided for each axis of the robot, and these circuits supply a motive force to servo motors for respective axes of the robot via respective servo amplifiers.

Furthermore, receiving means and transmitting means are provided for wireless communications with the teaching pendant (see FIG. 5). The receiving means include a wireless receiving circuit and packet receiving circuits 2 and 3 which are connected to this wireless receiving circuit. These packet receiving circuits 2 and 3 are packet receiving circuits which are respectively installed in correspondence with the above-mentioned packet transmitting circuits 2 and 3, and are respectively connected to the emergency stop control circuits 2 and 1. Furthermore, the packet receiving circuit 3 is also connected to the transmitting means and CPU.

The emergency stop control circuit 1 and emergency stop control circuit 2 are respectively connected to the electromagnetic contact device 1 and electromagnetic contact device 2. These electromagnetic contact devices 1 and 2 are built into the motive force supply path to the servo amplifiers in a series relationship. Accordingly, if at least one of the electromagnetic contact devices 1 and 2 is placed in a "cut-off" state, the supply of a motive force to the servo amplifiers is cut off, so that the robot is immediately stopped under emergency conditions.

As in the case of Embodiment 1, transmission data (packet data) provided with a header which indicates the origin of the packet is transmitted by wireless communications from the teaching pendant. The wireless receiving circuit receives this data, and attempts to transfer the data to the packet receiving circuits 2 and 3. However, only the packet receiving circuit 2 or the packet receiving circuit 3 designated by the header of the packet accepts the packet data; the other packet receiving circuit rejects the acceptance of the packet data.

In a case where the packet receiving circuit 3 accepts the packet data, this data is read by the CPU, and a judgement is made as to whether the data is general data (robot position data, jog feeding command data or the like) or data relating to emergency stopping. If the data is the former type of data, the robot is controlled in accordance with this general data. On the other hand, if the data is the latter type of data (it should be noted that this data is transmitted at short intervals as described above), data relating to the need for emergency stopping is read, and if "emergency stopping is necessary", an emergency stop signal is sent to the emergency stop control circuit 1.

Meanwhile, the packet receiving circuit 2 also accepts packet data relating to emergency stopping at short intervals, and if this data is data indicating that "emergency stopping is necessary", an emergency stop signal is sent to the emergency stop control circuit 2.

As a result, the electromagnetic contact devices 1 and 2 are both placed in a "cut-off state (contacts open)", so that the supply of motive force to the servo amplifiers is cut off, and the robot is immediately stopped under emergency conditions.

Furthermore, in cases where it is desired to release the emergency-stop state after the robot has been caused to make an emergency stop, it is necessary merely to return the emergency stop button to its original state. However, in order to avoid erroneous release of the emergency-stop state, a further separate operation (e.g., inputting special command data from the keyboard) is required in order to release the emergency-stop state.

It is clear that a failsafe function for two systems that transmit the emergency-stop state is exhibited in the present embodiment as well. For example, even in cases where the transmission packet generating circuit 2 (or 3) malfunctions, so that a packet indicating that the emergency stop button has been pressed is not transmitted even though the emergency stop button has been pressed, the other transmission packet generating circuit 3 (or 2) notifies the control part side of the emergency-stop state, so that the robot is caused to make an emergency stop.

For similar reasons, even-if one of the packet receiving circuits 2 or 3, one of the emergency stop control circuits 1 or 2 or one of the electromagnetic contact devices 1 or 2 malfunctions so as not to operate normally, safety can be ensured by the other normal circuit.

Furthermore, in cases where such trouble occurs, since the states of the two emergency stop control circuits are different from each other where these states should be the same under normal conditions, the fact that trouble has occurred can easily be detected. Accordingly, as described in the explanation of Embodiment 1, for example, the system may be devised so that the outputs of the emergency stop control circuits 1 and 2 are also sent to the CPU, the CPU ascertains at short intervals whether the emergency stop control circuits 1 and 2 are in the same state or different states, and if the emergency stop control circuits 1 and 2 are in different states, an alarm indicating "trouble in connection with the emergency stop function" is issued.

Furthermore, instead of this or in addition to this, it is also be possible to devise the system so that the CPU monitors whether the electromagnetic contact devices 1 and 2 are in the same state or different states with regard to the opening and closing of the contacts, and so that an alarm indicating "trouble in connection with the emergency stop function" is issued if the electromagnetic contact devices 1 and 2 are in different states. The need for repair can be ascertained by means of such an alarm, so that a situation in which both systems are malfunctioning can be almost completely avoided.

Furthermore, in the present embodiment as well, it is not particularly difficult to design the system so that an emergency-stop state is replaced with a packet indicating a state that expresses an emergency stop release as a result of trouble in the transmission data switching circuit, wireless transmitting circuit or wireless receiving circuit in cases where such trouble occurs. Specifically, by generating a CRC code that indicates the appropriateness of the contents of the packets inside the transmission packet generating circuits, it is possible to detect the non-matching of CRC codes on the receiving side in cases where the contents of the packets are rewritten at an intermediate point, so that the packet information can be rejected.

Furthermore, wireless communications may be impeded by noise and the like. While communications are thus impeded, there is a danger if an emergency stop is not be transmitted. Accordingly, a watchdog timer may be installed in the receiving means, and in cases where a packet transmitting an emergency-stop state is not received within a fixed period of time, an emergency stop signal is output to the emergency stop control circuits 1 and 2 in the same manner as in cases where data expressing an emergency stop is transmitted, so that the robot is caused to make an emergency stop.

Embodiment 3

Figure 7:
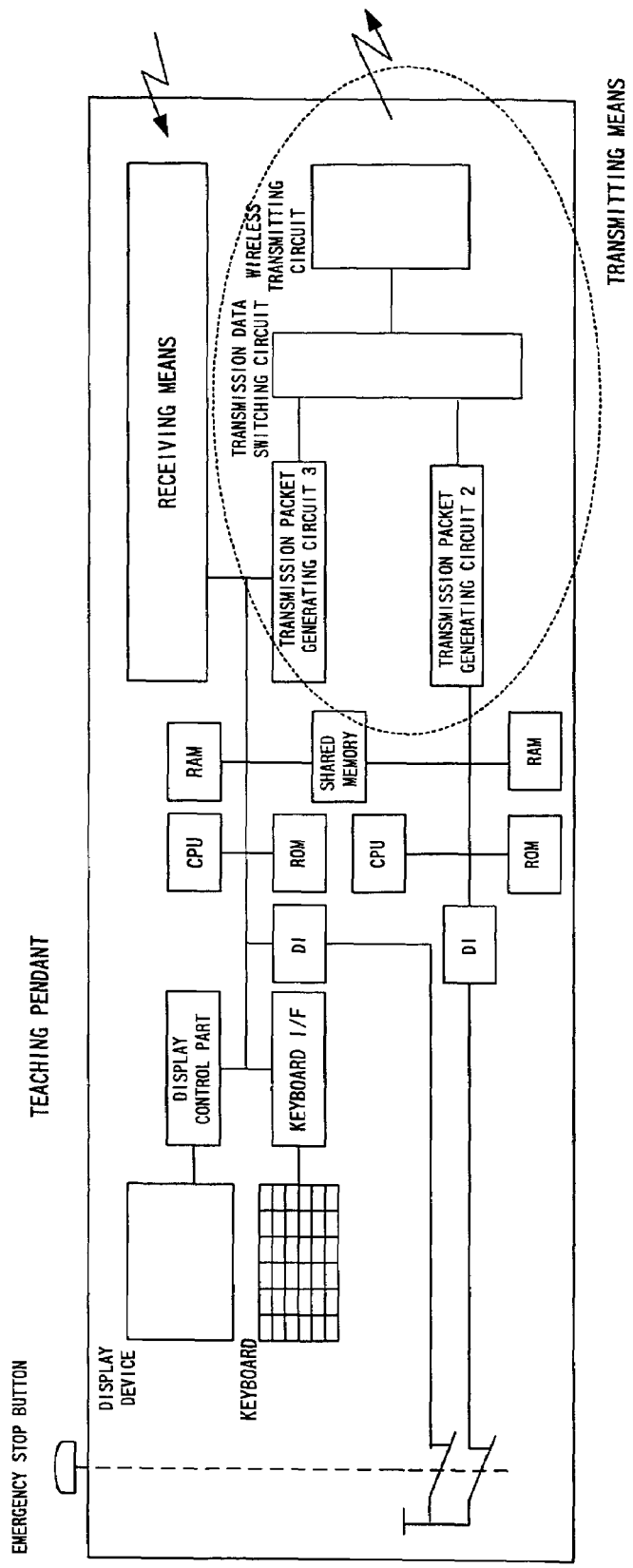
FIG. 7 is a diagram which illustrates the teaching pendant used in Embodiment 3 of the present invention.

FIG. 7 is a diagram which illustrates the teaching pendant used in Embodiment 3 and shows a schematic diagram of the panel with an emphasis on parts relating to the generation, transmission, reception and the like of emergency stop signals. In the present embodiment, two emergency stop signals are respectively read by separate CPUs, and so that the respective CPUs transmit data relating to the need for emergency stopping to the control part side via transmitting means. The two CPU circuits are connected to separate paths, and operate independently; however, the respective CPU circuits monitor the normal operation of each other by exchanging information via a shared memory. If one CPU detects that the other CPU is not operating normally, this CPU notifies the control part via its own transmission data generating circuit, and the robot is safely stopped on the robot control part side.

Referring to FIG. 7, the teaching pendant which constitutes a portable teaching operating part has two CPUs that are connected to each other via a shared memory, and ROMs, RAMs and data interfaces (IDs) that are connected to the respective CPUs. A display control part and a keyboard interface are further connected to one of the CPUs; furthermore, a display device (e.g., a liquid crystal display) is controlled via this display control part, and a keyboard (disposed on the teaching pendant) is connected to the keyboard interface.

Furthermore, receiving means and transmitting means are provided for wireless communications with the robot control part (not shown in the figures). The receiving means receive signals that are transmitted by wireless communications from transmitting means disposed in the robot control part. The transmitting means comprise two transmission packet generating circuits 2 and 3, a transmission data switching circuit, and a wireless transmitting circuit which is connected to the respective transmission packet generating circuits via this transmission data switching circuit.

Here, like the transmission packet generating circuit 1 or 2 in Embodiments 1 and 2, the transmission packet generating circuit 2 is used to transmit emergency stop signal data to the robot control part. On the other hand, the transmission packet generating circuit 3 is used to notify the robot control part of general data (robot position data, jog feeding command data and the like) in addition to emergency stop signal data. However, in the present embodiment, the transmission packet generating circuits 2 and 3 are respectively connected to one or the other CPU, and accept emergency stop signals via the respective CPUs.

An emergency stop button which serves as both "emergency stop operating means" and "emergency stop release operating means" is disposed in an appropriate place on the teaching pendant, and when the operator operates (here, "presses") this emergency stop button, an emergency stop signal is read by the respective CPUs. Accordingly, the respective CPUs check for the presence or absence of an emergency stop signal output (pressing or non-pressing of the emergency stop button) at sufficiently short intervals.

Under the control of the respective CPUs, the transmission packet generating circuits 2 and 3 constantly prepare transmission data relating to emergency stopping at time intervals that are equal to or shorter than a specified period of time (e.g., 0.1 second), and transmit this data to the transmission data switching circuit. The timing of the preparation and transmission of the transmission data is determined utilizing the clocks of the respective CPUs. Besides a data part expressing data that indicates whether or not the emergency stop button has been pressed, the respective sets of transmission data prepared by the transmission packet generating circuits 2 and 3 include a header which indicates that the data is data that is addressed to the two packet receiving circuits (not shown in the figures) that are provided in the robot control part, and a CRC part for detecting cases where the data has been disturbed by noise or the like. Furthermore, besides data relating to emergency stopping (which is prepared at short intervals), general data (prepared when the keyboard is operated) is included in the transmission data that is prepared by the transmission packet generating circuit 3.

The transmission data switching circuit appropriately switches the transmission data that is to be transferred to the wireless transmitting circuit in accordance with requests from the transmission packet generating circuits 2 and 3, and successively transfers this transmission data to the wireless transmitting circuit. The wireless transmitting circuit converts this data into a high-frequency signal, and transmits this signal by wireless transmission. As a result, the robot control part (not shown in the figures) is notified at short time intervals as to whether or not there is a need for emergency stopping (i.e., whether the emergency stop button has been pressed or has not been pressed). Furthermore, the robot control part is notified of general data when necessary, e.g., at the time of keyboard operation or the like.

In the robot control part, as in Embodiments 1 and 2, data relating to emergency stopping and general data are received by two packet receiving circuits via a wireless receiving circuit, and the opening and closing of two electromagnetic contact devices 1 and 2 is respectively controlled via two emergency stop control circuits. These electromagnetic contact devices are built into the motive force supply path to the servo amplifiers in a series relationship. Accordingly, if at least one electromagnetic contact device is in a "cut-off (open)" state, the supply of motive force to the servo amplifiers is cut off, so that the robot immediately makes an emergency stop.

Furthermore, in cases where it is desired to release the emergency-stop state after the robot has been caused to make an emergency stop, it is necessary merely to return the emergency stop button to its original state. However, in order to avoid erroneous release of the emergency-stop state, a further separate operation (e.g., inputting special command data from the keyboard) is required in order to release the emergency-stop state.

It is clear that a failsafe function for two systems that transmit the emergency-stop state is exhibited in the present embodiment as well. For example, even in cases where the transmission packet generating circuit 2 (or 3) malfunctions, so that a packet indicating that the emergency stop button has been pressed is not transmitted even though the emergency stop button has been pressed, the other transmission packet generating circuit 3 (or 2) notifies the control part side of the emergency-stop state, so that the robot is caused to make an emergency stop.

For similar reasons, even if one of the packet receiving circuits, one of the emergency stop control circuits or one of the electromagnetic contact devices malfunctions so as not to operate normally, safety can be ensured by the other normal circuit.

Furthermore, each CPU respectively writes the presence or absence of an emergency stop signal output of the system on its own side into the shared memory at short time intervals, and reads the data that is written regarding the presence or absence of an emergency stop signal output of the system on the side of the other CPU. Accordingly, if the states of the two systems regarding the output of an emergency stop signal do not match, it is judged that trouble has occurred, and an alarm is output. Furthermore, emergency stop data is transmitted to the robot control part using the transmitting means (using the two systems). As a result, the robot can be safely stopped even when one system is malfunctioning.

Furthermore, in the present embodiment, an example was indicated in which mutual monitoring is accomplished via a shared memory. Besides this, however, a method in which information is exchanged by performing serial communications between the CPUs, or a method in which information is exchanged via digital input and output of the CPUs, is also conceivable as means for accomplishing mutual monitoring.

Embodiment 4

Figure 8:
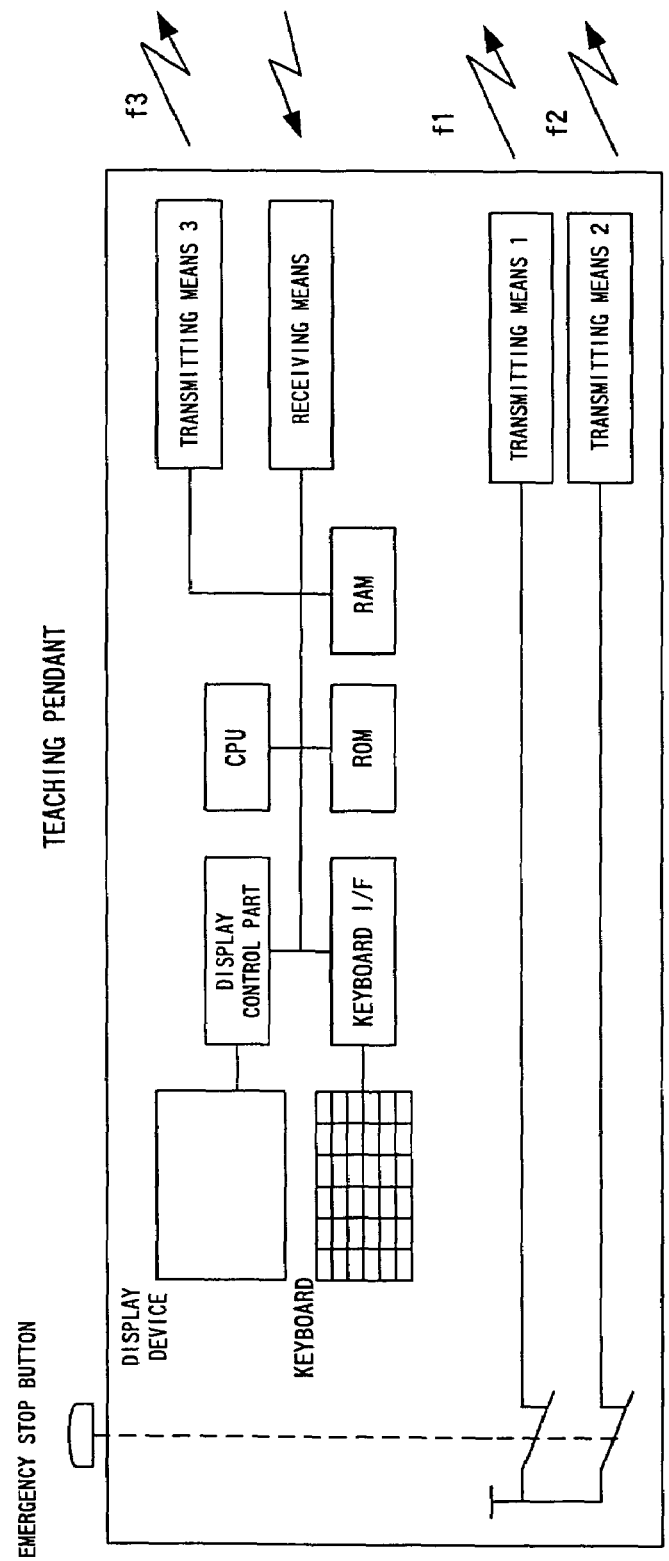
FIG. 8 is a diagram which illustrates the teaching pendant used in Embodiment 4 of the present invention.
Figure 9:
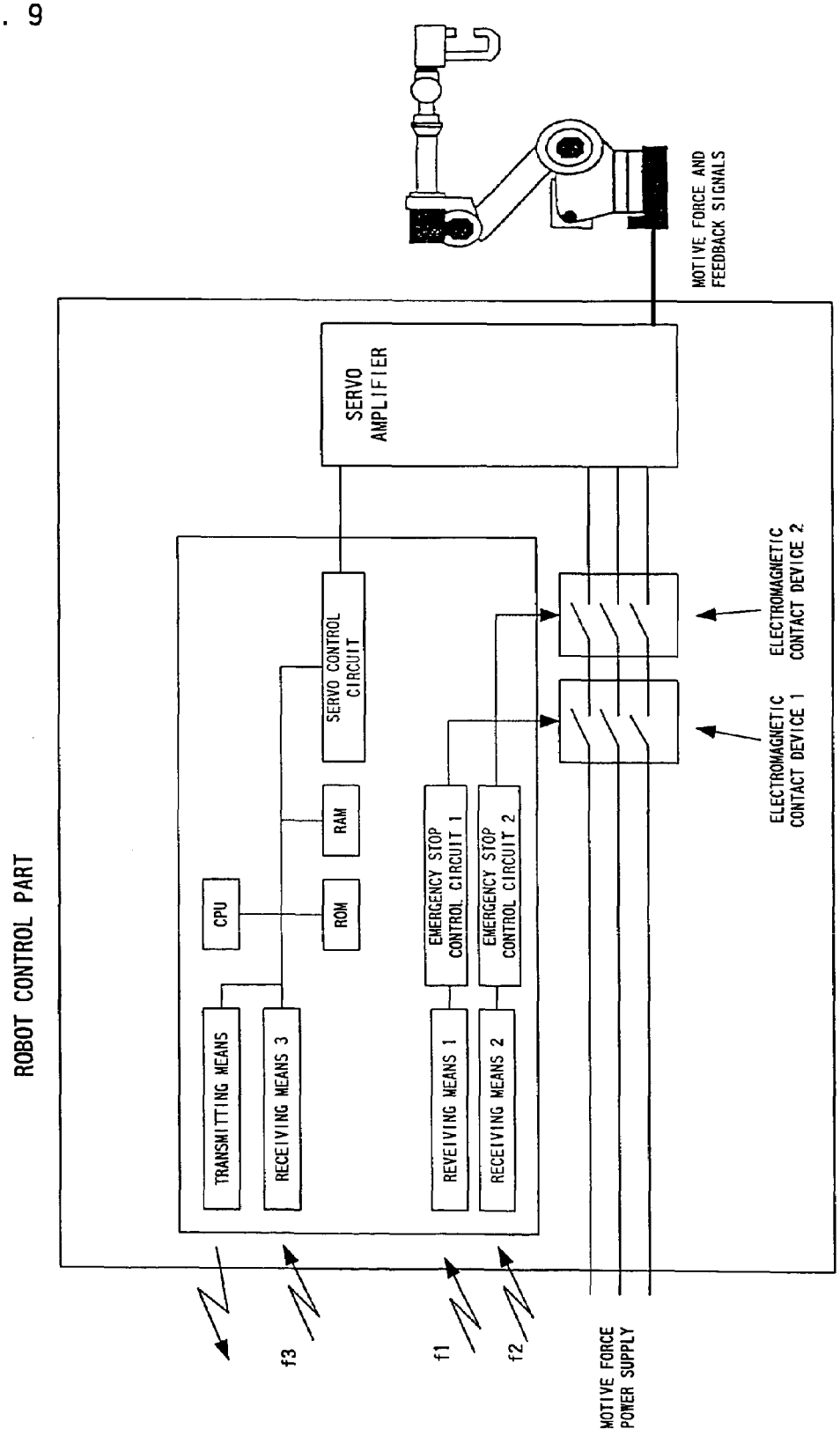
FIG. 9 is a diagram which illustrates the robot control part used in Embodiment 4 of the present invention.

FIG. 8 is a diagram which illustrates the teaching pendant used in Embodiment 4, and shows a schematic diagram with an emphasis on parts relating to the generation, transmission, reception and the like of emergency stop signals. Furthermore, FIG. 9 is a diagram which illustrates the robot control part used in Embodiment 4, and shows a schematic diagram with an emphasis on communications relating to emergency stopping of the robot and part relating to control of the robot, along with the main body part of the robot.

In the present embodiment, two transmitting means (on the side of the teaching pendant) and two receiving means (on the side of the robot control part) are used for the transmission and reception of emergency stop signals.

The respective transmitting means transmit input emergency stop signals to the corresponding receiving means. For this purpose, the two systems perform communications using separate frequencies. Furthermore, the respective transmitting means constantly transmit information indicating the pressing or non-pressing of the emergency stop button at short time intervals so that the state regarding the need for emergency stopping is constantly monitored by the robot control part. The transmission timing may be generated inside the portable teaching operating part, or may be provided by communications from the side of the control part.

First, referring to FIG. 8, the teaching pendant which constitutes the portable teaching operating part has a CPU, and a ROM, RAM display control part and keyboard interface which are connected to this CPU. A display device (e.g., a liquid crystal display) is connected to the display control part, and a keyboard (disposed on the teaching pendant) is connected to the keyboard interface.

Furthermore, one receiving means and three transmitting means 1 through 3 are provided for wireless communications with the robot control part (see FIG. 9). The receiving means receive signals that are transmitted by wireless communications from transmitting means disposed in the robot control part. As in the embodiments described above (although this is not shown in the figures), the respective transmitting means comprise transmission packet generating circuits, a transmission data switching circuit, and a wireless transmitting circuit which is connected to the respective transmission packet generating circuits via this transmission data switching circuit.

Here, the transmitting means 1 and 2 are used to transmit emergency stop signal data, and the transmitting means 3 are used to transmit general data (robot position data, jog feeding command data and the like). The functions of these elements contained in the respective transmitting means, the constitution of the transmission data and the like are the same as in the case of the respective embodiments described above; accordingly, a redundant description is omitted.

An emergency stop button which serves as both "emergency stop operating means" and "emergency stop release operating means" is disposed in an appropriate place on the teaching pendant. When the operator operates (here, "presses") this emergency stop button, an emergency stop signal is set to the transmitting means 1 and 2 and the respective transmission packet generating circuits (not shown in the figures). These transmission packet generating circuits constantly prepare transmission data relating to emergency stopping at time intervals that are equal to or shorter than a specified period of time (e.g., 0.1 second), and send this data to the transmission data switching circuit (not shown in the figures).

The wireless transmitting circuit converts this data into high-frequency signals, and sends these signals out by wireless communications. Here, the frequencies f1 and f2 of the high-frequency signals are set so that these frequencies are different in the transmitting means 1 (f1) and transmitting means 2 (f2). Furthermore, the transmitting means 3 send out general data at a frequency f3 that is different from both f1 and f2.

Next, referring to FIG. 9, the robot control part has a CPU, and a ROM, RAM and servo control circuits that are connected to this CPU. Servo control circuits are provided for the respective axes of the robot, and respectively supply a motive force to servo motors for the respective axes of the robot via servo amplifiers.

Furthermore, one transmitting means and three receiving means 1 through 3 are provided for wireless communications with the teaching pendant (see FIG. 8). Although this is not shown in the figures, the respective receiving means include a wireless receiving circuit and packet receiving circuits that are connected to this wireless receiving circuit. The receiving means 3 receive signals with a frequency of f3. These signals relate to general data, and are read by the CPU; the general control that is required is performed based on these signals. Meanwhile, the receiving means 1 and 2 respectively receive signals of frequencies f1 and f2. These signals have data relating to the need for emergency stopping. In cases where a signal indicating that "emergency stopping is necessary" is received, an emergency stop signal is sent to the corresponding emergency stop control circuit 1 or 2. As a result, in the same manner as in the above mentioned embodiments, the electromagnetic contact device 1 or 2 is "cut off", so that the supply of motive force to the servo amplifiers is interrupted, and the robot immediately makes an emergency stop.

Furthermore, in cases where it is desired to release the emergency-stop state after the robot has been caused to make an emergency stop, it is necessary merely to return the emergency stop button to its original state. However, in order to avoid erroneous release of the emergency-stop state, a further separate operation (e.g., inputting special command data from the keyboard) is required in order to release the emergency-stop state.

It is clear that a failsafe function for two systems that transmit the emergency-stop state is exhibited in the present embodiment as well. Even if any of the transmitting means 1, receiving means 1, emergency stop control circuit 1 or electromagnetic contact device 1 should malfunction, safety is ensured if the transmitting means 2, receiving means 2, emergency stop control circuit 2 and electromagnetic contact device 2 operate normally. Similarly, even if any of the transmitting means 2, receiving means 2, emergency stop control circuit 2 or electromagnetic contact device 2 should malfunction, safety is ensured if the transmitting means 1, receiving means 1, emergency stop control circuit 1 and electromagnetic contact device 1 operate normally.

Furthermore, if trouble of the abovementioned type should occur, the states of the two emergency stop control circuits 1 and 2 will be different where these states should be the same under normal conditions. Accordingly, as was described above, the fact that trouble has occurred can easily be detected. Accordingly, in cases where trouble is detected, the operator can be notified by an alarm or the like, and can be urged to make repairs.

Embodiment 5

Figure 10:
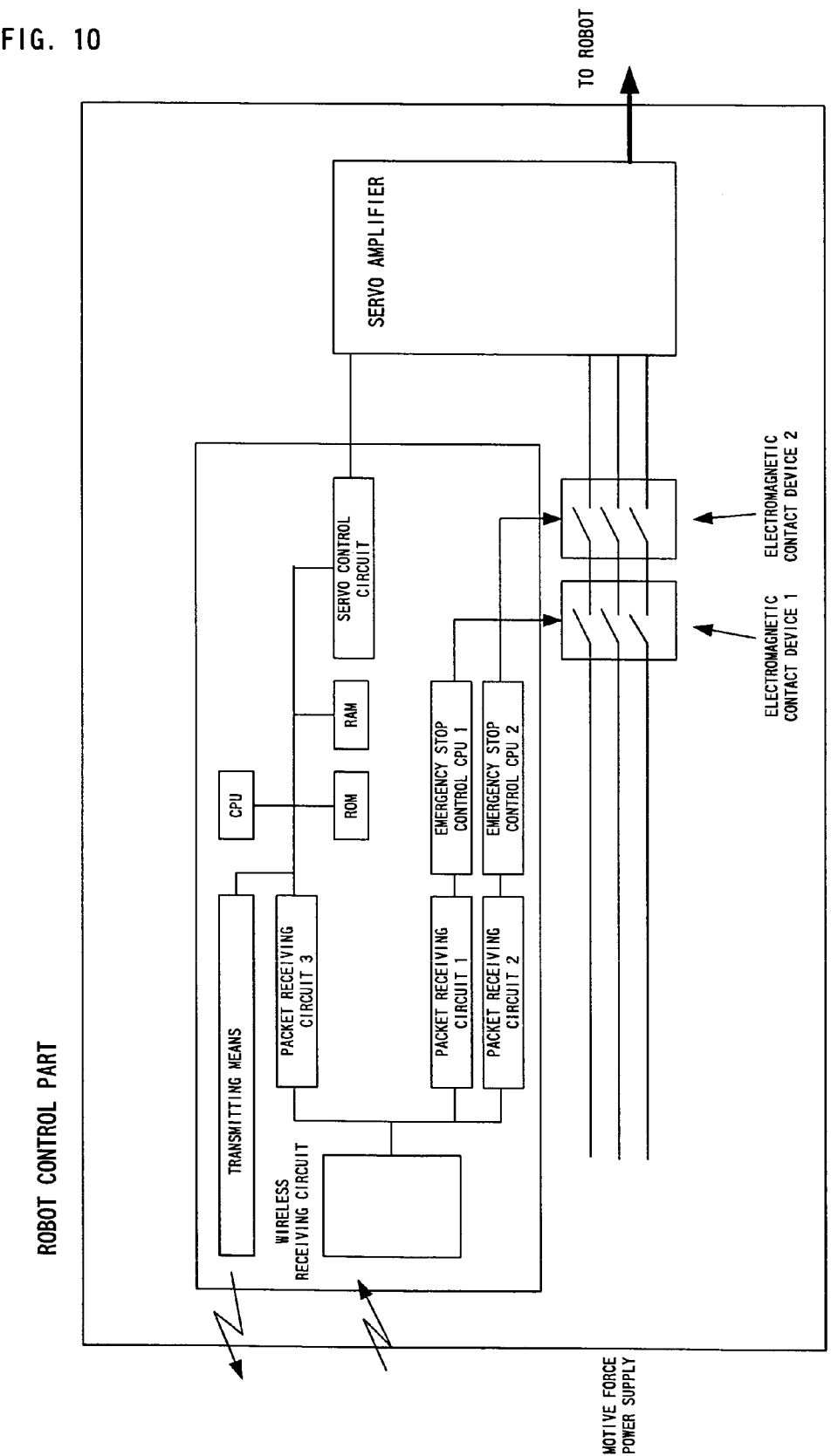
FIG. 10 is a diagram which illustrates the robot control part used in Embodiment 5 of the present invention.

FIG. 10 is a diagram which illustrates the robot control part used in Embodiment 5; this figure shows a schematic diagram with an emphasis on communications relating to the emergency stopping of the robot and parts relating to the control of the robot, together with the main body part of the robot. In regard to the teaching pendant, the teaching pendant used in Embodiment 1 described above (see FIG. 1) can be used.

The characterizing feature of the present embodiment is as follows: specifically, two packet receiving circuits that receive data relating to emergency stopping, two emergency stop control CPUs and two electromagnetic contact devices are provided, the state of emergency stop signals which the respective packet receiving circuits receive is monitored by the respective corresponding emergency stop control CPUs, and when an emergency stop is detected, the robot is stopped by opening the corresponding electromagnetic control device.

The respective emergency stop control CPUs can also simultaneously monitor emergency stop signals other than emergency stop signals from the teaching pendant, e.g., emergency stop signals from outside the control part. Furthermore, the emergency stop control CPUs can also simultaneously perform other functions, e.g., the function of robot control CPUs. Moreover, the emergency stop control CPUs may also perform the function of stopping the robot in cases where fixed-time packets of the packet receiving circuits do not arrive.

Viewing this in concrete terms, as is shown in FIG. 10, the robot control part has a general CPU, and a ROM, RAM and servo control circuits connected to this CPU. Servo control circuits are provided for the respective axes of the robot, and a motive force is supplied to servo motors for the respective axes of the robot via respective servo amplifiers.

Furthermore, receiving means and transmitting means are provided for wireless communications with the teaching pendant (see FIG. 1). The receiving means include a wireless receiving circuit and packet receiving circuits 1 through 3 that are connected to this wireless receiving circuit. The packet receiving circuits 1 through 3 are packet receiving circuits that are respectively disposed in correspondence with the packet transmitting circuits 1 through 3 (see FIG. 1). The packet receiving circuits 1 and 2 are respectively connected to the emergency stop control CPUs 11 and 2, and the packet receiving circuit 3 is connected to the transmitting means and to a separate CPU for general use.

The electromagnetic contact devices 1 and 2 are built into the motive force supply path to the servo amplifiers in a series relationship. Accordingly, if at least one of the electromagnetic contact devices 1 and 2 is placed in a "cut-off" state, the supply of motive force to the servo amplifiers is cut off, so that the robot immediately makes an emergency stop.

As was described above, transmission data (packets) to which headers that indicate the origin of the packet generation are attached are transmitted by wireless communications from the teaching pendant. The wireless receiving circuit receives this data, and attempts to transfer the data to the packet receiving circuits 1 through 3. However, only the packet receiving circuits 1 and 2 or the packet receiving circuit 3 designated by the packet headers accept the packet data; the remaining packet receiving circuits refuse to accept the packet data.

In cases where the packet receiving circuit 3 accepts the packet data, this data (as was described above) is general data such as robot position data, jog feeding command data or the like, and the CPU performs control of the robot and the like in accordance with this data.

On the other hand, the packet receiving circuits 1 and 2 successively receive packet data including data relating to the need or lack of need for emergency stopping which is transmitted at short time intervals as was described above. In cases where the emergency stop button is pressed, the respective emergency stop control CPUs 1 and 2 place the corresponding electromagnetic contact devices in a "cut-off (contacts open)" state. As a result, the supply of motive force to the servo amplifiers is cut off, so that the robot immediately makes an emergency stop.

It is clear that a failsafe function for two systems that transmit the emergency-stop state is exhibited in the present embodiment as well. A detailed description regarding this point would be redundant; accordingly, such a description is omitted.

Embodiment 6

Figure 11:
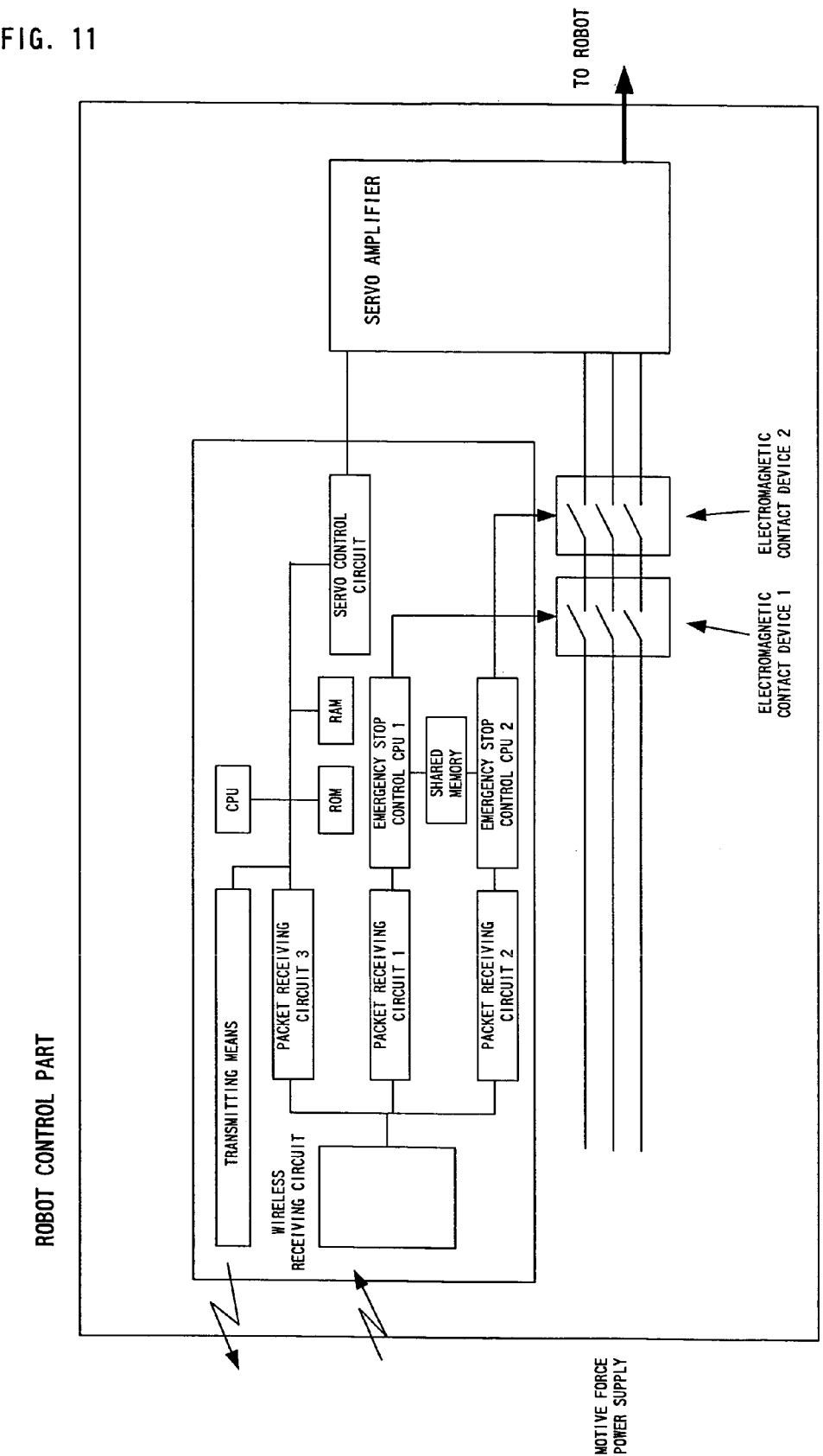
FIG. 11 is a diagram which illustrates the robot control part used in Embodiment 6 of the present invention.

FIG. 11 is a diagram which illustrates the robot control part used in Embodiment 6. This figures shows a schematic diagram with an emphasis on communications relating to the emergency stopping of the robot, and parts relating to the control of the robot. In regard to the teaching pendant, the teaching pendant used in the abovementioned Embodiment 1 (see FIG. 1) can be used.

The characterizing feature of the present embodiment is that a shared memory is added to the robot control part used in the abovementioned Embodiment 5, so that each system can monitor the normal operation of the other system. If one system detects that the other system is not operating normally, the CPU of this system safely stops the robot via the emergency stop control branch path on its own side.

Viewing this in concrete terms, as is shown in FIG. 11, the robot control part has a CPU for general use, and a ROM, RAM and servo control circuits that are connected to this CPU. Servo control circuits are provided for the respective axes of the robot, and a motive force is supplied to the servo motors of the respective axes of the robot via respective servo amplifiers.

Furthermore, receiving means and transmitting means are provided for wireless communications with the teaching pendant (see FIG. 1). The receiving means include a wireless receiving circuit and packet receiving circuits 1 through 3 which are connected to this wireless receiving circuit. The packet receiving circuits 1 through 3 are packet receiving circuits that are respectively installed in correspondence with the packet transmitting circuits 1 through 3 (see FIG. 1). The packet receiving circuits 1 and 2 are respectively connected to the emergency stop control CPUs 1 and 2, and the packet receiving circuit 3 is connected to the transmitting means and the separate CPU for general use.

These electromagnetic contact devices 1 and 2 are built into the motive force supply path to the servo amplifiers in a series relationship. Accordingly, if at least one of the electromagnetic contact devices 1 and 2 assumes a "cut-off"

state, the supply of motive force to the servo amplifiers is cut off, so that the robot immediately makes an emergency stop.

As was described above, transmission data (packets) to which headers that indicate the origin of the packet generation are attached are transmitted by wireless communications from the teaching pendant. The wireless receiving circuit receives this data, and attempts to transfer the data to the packet receiving circuits 1 through 3. However, only the packet receiving circuits 1 and 2 or the packet receiving circuit 3 designated by the packet headers accept the packet data; the remaining packet receiving circuits refuse to accept the packet data.

In cases where the packet receiving circuit 3 accepts the packet data, this data (as was described above) is general data such as robot position data, jog feeding command data or the like, and the CPU performs control of the robot and the like in accordance with this data.

On the other hand, the packet receiving circuits 1 and 2 successively receive packet data including data relating to the need or lack of need for emergency stopping which is transmitted at short time intervals as was described above. In cases where the emergency stop button is pressed, the respective emergency stop control CPUs 1 and 2 place the corresponding electromagnetic contact devices 1 and 2 in a "cut-off (contacts open)" state. As a result, the supply of motive force to the servo amplifiers is cut off, so that the robot immediately makes an emergency stop. It is clear that a failsafe function for two systems that transmit the emergency-stop state is exhibited in the present embodiment as well. A detailed description regarding this point would be redundant; accordingly, such a description is omitted.

Here, furthermore, as a characterizing feature of the present embodiment, the emergency stop control CPUs 1 and 2 monitor each other's operation via a shared memory. Specifically, each of the emergency stop control CPUs 1 and 2 respectively writes the presence or absence of the output of an emergency stop signal from the system on its own side into the shared memory at short time intervals, and reads data that is written regarding the presence or absence of the output of an emergency stop signal from the system on the other side. Accordingly, if the states of the two systems regarding the output of an emergency stop signal do not match, it is judged that trouble has occurred; consequently, an alarm is output, and the abovementioned emergency stop control CPU places the electromagnetic contact device on its own side in a "cut-off (contacts open)" state, so that the robot is stopped.

Embodiment 7

Figure 12:
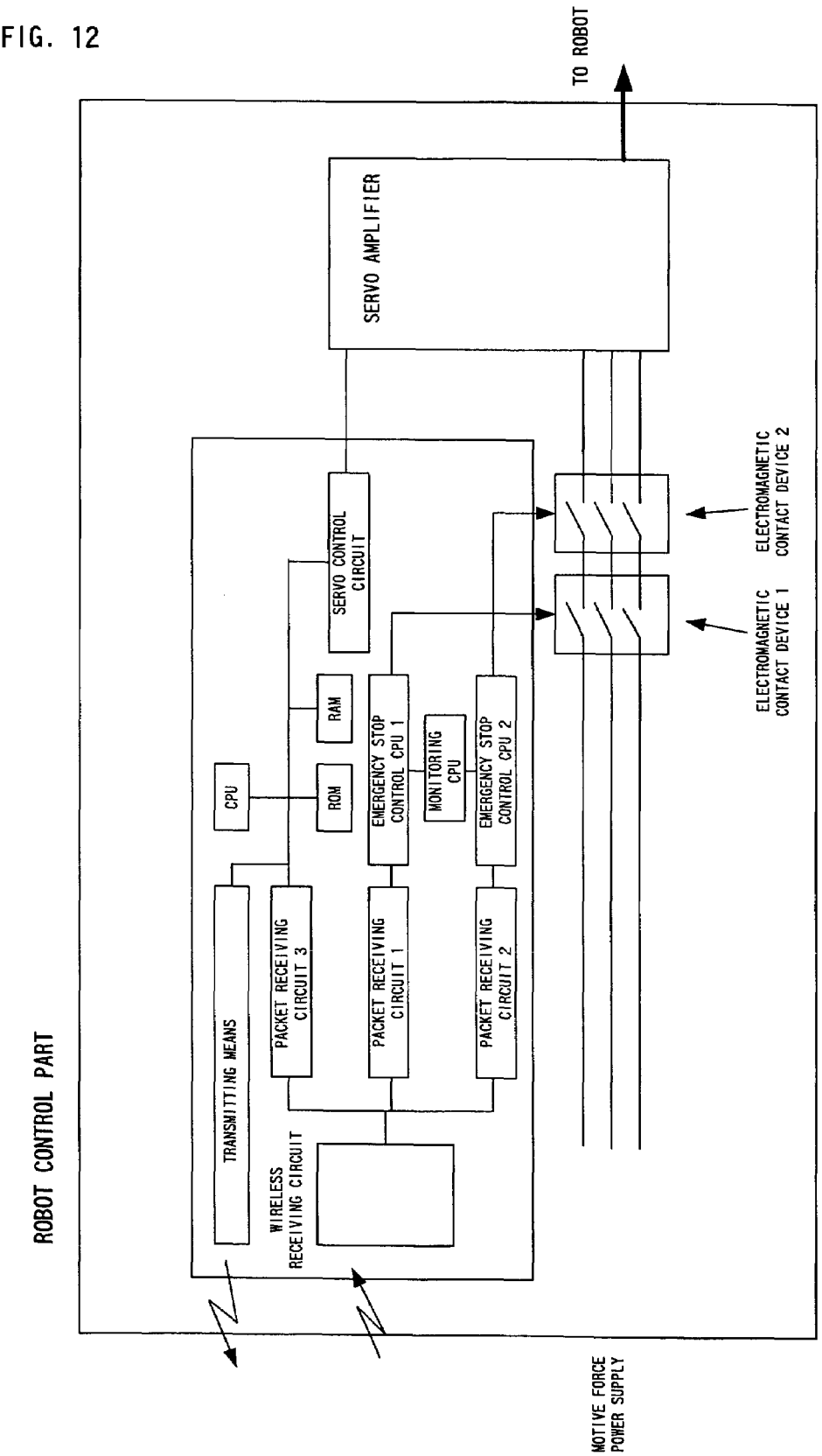
FIG. 12 is a diagram which illustrates the robot control part used in Embodiment 7 of the present invention.

FIG. 12 is a diagram which illustrates the robot control part used in Embodiment 7, and shows a schematic diagram with an emphasis on communications relating to the emergency stopping of the robot and parts relating to the control of the robot. In regard to the teaching pendant, the teaching pendant used in the abovementioned Embodiment 1 (see FIG. 1) can be used.

The characterizing feature of the present embodiment is that a separate monitoring CPU is provided in order to monitor the respective emergency stop control CPUs disposed in the robot control part. This monitoring CPU monitors the states of the respective emergency stop control CPUs, and stops the robot if an abnormality is detected. The monitoring CPU may also perform some other function, such as the function of a CPU used for control of the robot. Furthermore, the monitoring CPU may also be caused to perform the function of stopping the robot in cases where packets are not received from the packet receiving circuits for a fixed period of time.

Viewing this in concrete terms, as is shown in FIG. 12, the robot control part has a CPU for general use, and a ROM, RAM and servo control circuits that are connected to this CPU. Servo control circuits are provided for the respective axes of the robot, and a motive force is supplied to the servo motors of the respective axes of the robot via respective servo amplifiers.

Furthermore, receiving means and transmitting means are provided for wireless communications with the teaching pendant (see FIG. 1). The receiving means include a wireless receiving circuit and packet receiving circuits 1 through 3 which are connected to this wireless receiving circuit. The packet receiving circuits 1 through 3 are packet receiving circuits that are respectively installed in correspondence with the packet transmitting circuits 1 through 3 (see FIG. 1). The packet receiving circuits 1 and 2 are respectively connected to the emergency stop control CPUs 1 and 2, and the packet receiving circuit 3 is connected to the transmitting means and the separate CPU for general use.

The electromagnetic contact devices 1 and 2 are built into the motive force supply path to the servo amplifiers in a series relationship. Accordingly, if at least one of the electromagnetic contact devices 1 and 2 assumes a "cut-off" state, the supply of motive force to the servo amplifiers is cut off, so that the robot immediately makes an emergency stop.

As was described above, transmission data (packets) to which headers that indicate the origin of the packet generation are attached are transmitted by wireless communications from the teaching pendant. The wireless receiving circuit receives this data, and attempts to transfer the data to the packet receiving circuits 1 through 3. However, only the packet receiving circuits 1 and 2 or the packet receiving circuit 3 designated by the packet headers accept the packet data; the remaining packet receiving circuits refuse to accept the packet data.

In cases where the packet receiving circuit 3 accepts the packet data, this data (as was described above) is general data such as robot position data, jog feeding command data or the like, and the CPU performs control of the robot and the like in accordance with this data.

On the other hand, the packet receiving circuits 1 and 2 successively receive packet data including data relating to the need or lack of need for emergency stopping which is transmitted at short time intervals as was described above. In cases where the emergency stop button is pressed, the respective emergency stop control CPUs 1 and 2 place the corresponding electromagnetic contact devices in a "cut-off (contacts open)" state. As a result, the supply of motive force to the servo amplifiers is cut off, so that the robot immediately makes an emergency stop. It is clear that a failsafe function for two systems that transmit the emergency-stop state is exhibited in the present embodiment as well. A detailed description regarding this point would be redundant; accordingly, such a description is omitted.

Here, furthermore, as a characterizing feature of the present embodiment, the emergency stop control CPUs 1 and 2 are respectively connected to one monitoring CPU, and the operations of the respective sides are monitored by this monitoring CPU. Specifically, the monitoring CPU checks for matching or non-matching for the presence or absence of the output of emergency stop signals from the respective emergency stop control CPUs 1 and 2 at short time intervals, and if non-matching occurs, the monitoring CPU judges that trouble has occurred, and outputs an alarm.

Furthermore, the electromagnetic contact devices are placed in a "cut-off (contacts open)" state by the respective emergency stop control CPUs 1 and 2, so that the robot is caused to make an emergency stop.

Furthermore, in all of the respective embodiments described above, information indicating the presence or absence of pressing of the emergency stop button is constantly transmitted to the control part from the portable teaching operating part at short time intervals so that the conditions of emergency stopping can be constantly monitored by the control part. Moreover, the transmission timing may be generated inside the portable teaching operating part, or may be provided from the side of the control part via communications. However, in cases where transmission timing signals are generated inside the portable teaching operating part, the transmission intervals can also be varied depending on urgency of the information. For example, the timing of transmissions indicating that the emergency stop button has been pressed may be set at a shorter time than the timing of transmissions indicating that the emergency stop button has not been pressed.

The present invention makes it possible to transmit emergency stop signals with a much higher reliability than in conventional systems in a robot controller in which a portable teaching operating part comprising emergency stop operating means such as an emergency stop button or the like and a control part that controls the robot are connected by wireless communications. Accordingly, the safety of workers can be reliably ensured.

What is claimed is:

1. A robot controller which is constructed so that a control part for controlling a robot and a portable teaching operating part communicate with each other by wireless communications, wherein
    said portable teaching operating part comprises:
    emergency stop operating means which place said robot in an emergency-stop state by cutting off the supply of electric power to the driving motors of said robot;
    emergency stop release operating means which restore said robot to a state in which its movement is possible by releasing said emergency-stop state;
    a plurality of communications data generating circuits which respectively generate communications data expressing an emergency stop command based on operations for said emergency stop operating means, and which respectively generate communications data expressing an emergency stop release command based on operations for said emergency stop release operating means; and
    transmitting means which transmit communications data expressing said emergency stop command and communications data expressing said emergency stop release command to said control part by wireless communications; and
    said control part comprises:
    receiving means which receive communications data expressing said emergency stop command and communications data expressing said emergency stop release command from said transmitting means;
    wherein said receiving means place said robot in an emergency-stop state when receiving even a single set of communications data expressing an emergency stop command generated by said plurality of communications data generating circuits.

2. The robot controller according to claim 1, wherein an emergency stop signal is generated when an operation for the purpose of emergency stopping is performed on said emergency stop operating means, and at least one of said plurality of generating circuits receives said emergency stop signal via a CPU, and generates communications data expressing an emergency stop command.

3. The robot controller according to claim 1, wherein
    an emergency stop signal is generated when an operation for the purpose of emergency stopping is performed for said emergency stop operating means, and at least two of said plurality of generating circuits receive said emergency stop signal via CPUs, and respectively generate communications data expressing an emergency stop command;
    means are provided for causing each of said two CPUs to monitor the operation of the other CPU; and
    in cases where one CPU detects an abnormal operation of the other CPU, said control part is notified of the detection of this abnormality, and the robot is placed in a stopped state.

4. The robot controller according to claim 1, wherein
    said generating circuits generate communications data expressing a normal state in cases where no operation that places the robot in an emergency-stop state has been performed for the emergency stop operating means disposed in said portable teaching operating part, and said communications data expressing a normal state is transmitted by wireless communications to said control part from said transmitting means at a transmission frequency that is not less than a specified transmission frequency; and
    said robot is stopped by emergency stop control circuit in cases where the receiving means disposed in said control part cannot receive said communications data expressing a normal state for a specified period of time.

5. The robot controller according to claim 1, wherein the communications data expressing an emergency stop command received by the receiving means disposed in said control part is sent to a plurality of emergency stop control CPUs installed in correspondence with each of the said plurality of generating circuits, and the CPUs that receive communications data expressing an emergency stop command place said robot in an emergency-stop state.

6. The robot controller according to claim 5, wherein each of the plurality of emergency stop control CPUs disposed in said control part monitors the operating state of the other emergency stop control CPUs, and the robot is stopped when an operating abnormality of any of the CPUs is detected.

7. The robot controller according to claim 5, wherein a CPU other than said emergency stop control CPUs monitors the operating state of the emergency stop control CPUs, and the robot is stopped when an operating abnormality of at least one of the emergency stop control CPUs is detected.

8. The robot controller according to claim 1, wherein the timing of transmission from said portable teaching operating part to said control part is varied depending on urgency of the communications content.

9. A robot controller which is constructed so that a control part for controlling a robot and a portable teaching operating part communicate with each other by wireless communications, wherein
    said portable teaching operating part comprises:
    emergency stop operating means which place said robot in an emergency-stop state by cutting off the supply of electric power to the driving motors of said robot;
    emergency stop release operating means which restore said robot to a state in which its movement is possible by releasing said emergency-stop state;

a plurality of communications data generating circuits which respectively generate communications data expressing an emergency stop command based on operations for said emergency stop operating means, and which respectively generate communications data expressing an emergency stop release command based on operations for said emergency stop release operating means; and also a plurality of transmitting means which respectively correspond to said plurality of communications data generating circuits, and which transmit communications data expressing said emergency stop command and communications data expressing said emergency stop release command to said control part by wireless communications; and said control part comprises:

a plurality of receiving means which respectively correspond to each of said plurality of transmitting means, and which receive communications data from said transmitting means;

wherein at least one of the receiving means place said robot in an emergency-stop state when receiving communications data expressing an emergency stop command.

10. The robot controller according to claim 9, wherein an emergency stop signal is generated when an operation for the purpose of emergency stopping is performed for said emergency stop operating means, and at least one of said plurality of generating circuits receives said emergency stop signal via a CPU, and generates communications data expressing an emergency stop command.

11. The robot controller according to claim 9, wherein an emergency stop signal is generated when an operation for the purpose of emergency stopping is performed for said emergency stop operating means, at least two of said plurality of generating circuits receive said emergency stop signal via CPUs, and respectively generate communications data expressing an emergency stop command;

means are provided for causing each of said two CPUs to monitor the operation of the other CPU; and in cases where one CPU detects the abnormal operation of the other CPU, said control part is notified of the detection of this abnormality, and the robot is placed in a stopped state.

12. The robot controller according to claim 9, wherein said generating circuits generate communications data expressing a normal state in cases where no operation that places the robot in an emergency-stop state has been performed for the emergency stop operating means disposed in said portable teaching operating part, and said communications data expressing a normal state is transmitted by wireless communications to said control part from said transmitting means at a transmission frequency that is not less than a specified transmission frequency; and said robot is stopped by emergency stop control circuit in cases where the receiving means disposed in said control part cannot receive said communications data expressing a normal state for a specified period of time.

13. The robot controller according to claim 9, wherein the communications data expressing an emergency stop command received by the receiving means disposed in said control part is sent to a plurality of emergency stop control CPUs installed in correspondence with each of the said plurality of generating circuits, and the CPUs that receive communications data expressing an emergency stop command place said robot in an emergency-stop state.

14. The robot controller according to claim 9, wherein the timing of transmission from said portable teaching operating part to said control part is varied depending on urgency of the communication content.

* * * * *

UNITED STATES PATENT AND TRADEMARK OFFICE
CERTIFICATE OF CORRECTION

PATENT NO. : 7,133,747 B2
APPLICATION NO. : 10/679295
DATED : November 7, 2006
INVENTOR(S) : Yoshiki Hashimoto et al.

It is certified that error appears in the above-identified patent and that said Letters Patent is hereby corrected as shown below:

In the Drawings:

In Fig. 9 (in the box close to the pointer f1) change "REVEIVING MEANS 1" to --RECEIVING MEANS 1--

Col. 17, line 55, change "CPUs 11 and 2" to --CPUs 1 and 2--

Col. 18, line 31, change "figures" to --figure--

Col. 24, line 33, change "communication" to --communications--

Signed and Sealed this

Twenty-ninth Day of April, 2008

JON W. DUDAS
*Director of the United States Patent and Trademark Office*